US011431168B2

(12) United States Patent
Syracuse et al.

(10) Patent No.: US 11,431,168 B2
(45) Date of Patent: Aug. 30, 2022

(54) UAV AIRWAYS SYSTEMS AND APPARATUS

(71) Applicant: NXP Aeronautics Research, LLC, Parker, CO (US)

(72) Inventors: Steven J. Syracuse, Parker, CO (US); Chad D. Tillman, Matthews, NC (US)

(73) Assignee: NXP Aeronautics Research, LLC, Parker, CO (US)

(*) Notice: Subject to any disclaimer, the term of this patent is extended or adjusted under 35 U.S.C. 154(b) by 217 days.

(21) Appl. No.: 17/003,848

(22) Filed: Aug. 26, 2020

(65) Prior Publication Data

US 2021/0066913 A1   Mar. 4, 2021

Related U.S. Application Data

(60) Provisional application No. 62/891,963, filed on Aug. 26, 2019.

(51) Int. Cl.
*H02J 3/00* (2006.01)
*G06F 16/29* (2019.01)
(Continued)

(52) U.S. Cl.
CPC ............ *H02J 3/003* (2020.01); *B64C 39/024* (2013.01); *G06F 16/29* (2019.01); *G08G 5/003* (2013.01);
(Continued)

(58) Field of Classification Search
CPC .......... H02J 3/003; H02J 3/004; H02J 7/0047; H02J 13/00002; H02J 7/0044;
(Continued)

(56) References Cited

U.S. PATENT DOCUMENTS 3,834,654 A   9/1974   Miranda
4,146,199 A   3/1979   Wenzel
(Continued)

FOREIGN PATENT DOCUMENTS

CN   106248022 A   12/2016
CN   206163204 U   5/2017
(Continued)

OTHER PUBLICATIONS

Malhara, "Mechanical State Estimation of Overhead Transmission Lines Using Tilt Sensors", Aug. 2010, IEEE Transactions on Power Systems, pp. 1282-1290 (Year:2010), (9 pages).
(Continued)

*Primary Examiner* — Ziaul Karim
(74) *Attorney, Agent, or Firm* — Chad D Tillman; Tillman Wright, PLLC

(57) ABSTRACT

UAV airways system generally are disclosed. Such UAV airway systems may comprise UAV cargo transportation systems and UAV surveillance and monitoring systems. Such systems preferably overlay and are commensurate with a system of high-voltage power transmission lines of high-voltage transmission system, and electric field actuated (EFA) generators preferably are utilized in UAVs that travel along the transmission lines, in UAV charging stations located along the transmission lines, or in both. Each EFA generator represents a power supply and comprises first and second electrodes separated and electrically insulated from each other for enabling a differential in voltage at the first and second electrodes resulting from a differential in electric field strength experienced by the first and second electrodes arising from the power transmission lines of the high-voltage transmission system.

14 Claims, 27 Drawing Sheets

(51) Int. Cl.
*B64C 39/02* (2006.01)
*G08G 5/00* (2006.01)

(52) U.S. Cl.
CPC ........ *H02J 3/004* (2020.01); *B64C 2201/066* (2013.01); *B64C 2201/12* (2013.01)

(58) Field of Classification Search
CPC ............ B64C 39/024; B64C 2201/066; B64C 2201/12; B64C 2201/027; B64C 2201/127; G06F 16/29; G08G 5/003
See application file for complete search history.

(56) References Cited

U.S. PATENT DOCUMENTS

| | | | |
|---|---|---|---|
| 4,165,058 A | 8/1979 | Whitener | |
| 4,390,150 A | 6/1983 | Whitener | |
| 4,415,133 A | 11/1983 | Phillips | |
| 4,818,990 A | 4/1989 | Fernandes | |
| 5,235,861 A | 8/1993 | Seppa | |
| 5,473,233 A | 12/1995 | Stull et al. | |
| 5,503,352 A | 4/1996 | Eger | |
| 5,669,470 A | 9/1997 | Ross | |
| 5,808,424 A | 9/1998 | Osgood | |
| 6,028,973 A | 2/2000 | Schienle et al. | |
| 6,421,600 B1 | 7/2002 | Ross | |
| 6,431,499 B1 | 8/2002 | La Roche et al. | |
| 6,470,283 B1 | 10/2002 | Edel | |
| 6,626,398 B1 | 9/2003 | Cox et al. | |
| 6,848,649 B2 | 2/2005 | Churchman | |
| 6,879,889 B2 | 4/2005 | Ross | |
| 6,900,642 B2 | 5/2005 | Zank et al. | |
| 6,922,059 B2 | 7/2005 | Zank et al. | |
| 6,974,106 B2 | 12/2005 | Churchman | |
| 6,974,110 B2 | 12/2005 | Grandics | |
| 7,282,944 B2 | 10/2007 | Gunn et al. | |
| 7,286,912 B2 | 10/2007 | Rubin et al. | |
| 7,318,564 B1 | 1/2008 | Marshall | |
| 7,398,946 B1 | 7/2008 | Marshall | |
| 7,543,780 B1 | 6/2009 | Marshall et al. | |
| 7,714,536 B1 | 5/2010 | Silberg et al. | |
| 7,786,894 B2 | 8/2010 | Polk et al. | |
| 7,872,371 B2 | 1/2011 | Varley et al. | |
| 7,920,975 B2 | 4/2011 | Hull et al. | |
| 8,123,160 B2 | 2/2012 | Shepshelovich et al. | |
| 8,497,781 B2 | 7/2013 | Engelhardt et al. | |
| 8,508,186 B2 | 8/2013 | Morita et al. | |
| 8,511,606 B1 | 8/2013 | Lutke et al. | |
| 8,537,571 B2 | 9/2013 | Terasaki et al. | |
| 8,767,071 B1 | 7/2014 | Marshall | |
| 8,941,491 B2 | 1/2015 | Polk et al. | |
| 9,037,314 B2 | 5/2015 | Waite et al. | |
| 9,120,568 B2 | 9/2015 | Herman et al. | |
| 9,209,525 B2 | 12/2015 | Schantz et al. | |
| 9,214,827 B2 | 12/2015 | Phillips et al. | |
| 9,285,222 B2 | 3/2016 | Waite et al. | |
| 9,398,352 B2 | 7/2016 | Polk et al. | |
| 9,421,869 B1 | 8/2016 | Ananthanarayanan et al. | |
| 9,488,670 B2 | 11/2016 | Chan et al. | |
| 9,494,937 B2 | 11/2016 | Siegel et al. | |
| 9,508,264 B2 | 11/2016 | Chan et al. | |
| 9,564,268 B2 | 2/2017 | Dinwiddie et al. | |
| 9,653,948 B2 | 5/2017 | Polu et al. | |
| 9,694,685 B2 | 7/2017 | Ricci | |
| 9,723,468 B2 | 8/2017 | Cho | |
| 9,754,496 B2 | 9/2017 | Chan et al. | |
| 9,774,797 B2 | 9/2017 | Richards et al. | |
| 9,845,153 B2 | 12/2017 | Sekelsky | |
| 9,878,787 B2 | 1/2018 | Chan et al. | |
| 10,186,348 B2 | 1/2019 | Davis et al. | |
| 10,391,867 B1 | 8/2019 | Syracuse et al. | |
| 10,491,021 B1 | 11/2019 | Syracuse et al. | |
| 10,493,851 B1 | 12/2019 | Syracuse et al. | |
| 10,498,169 B1 | 12/2019 | Syracuse et al. | |
| 10,509,417 B2 | 12/2019 | van Cruyningen | |
| 10,564,649 B2 | 2/2020 | van Cruyningen | |
| 10,581,522 B1 | 3/2020 | Innes et al. | |
| 2001/0032905 A1 | 10/2001 | Grandics | |
| 2005/0178632 A1 | 8/2005 | Ross | |
| 2006/0009887 A1* | 1/2006 | Rubin | G01C 23/00 701/9 |
| 2008/0246507 A1 | 10/2008 | Gunn et al. | |
| 2010/0033345 A1 | 2/2010 | Polk | |
| 2010/0231056 A1 | 9/2010 | Varley et al. | |
| 2010/0292859 A1 | 11/2010 | Terasaki et al. | |
| 2010/0317978 A1 | 12/2010 | Maile | |
| 2011/0288777 A1 | 11/2011 | Gupta | |
| 2012/0016538 A1 | 1/2012 | Waite et al. | |
| 2013/0077368 A1 | 3/2013 | Kovacich | |
| 2013/0147427 A1 | 6/2013 | Polu et al. | |
| 2014/0253031 A1 | 9/2014 | Duge | |
| 2015/0226559 A1 | 8/2015 | Waite et al. | |
| 2015/0246614 A1 | 9/2015 | Dames et al. | |
| 2015/0274294 A1 | 10/2015 | Dahlstrom | |
| 2015/0336669 A1 | 11/2015 | Kantor et al. | |
| 2015/0353196 A1 | 12/2015 | van Cruyningen et al. | |
| 2015/0370251 A1 | 12/2015 | Siegel et al. | |
| 2016/0028230 A1 | 1/2016 | Elfman | |
| 2016/0091537 A1 | 3/2016 | Gaarder | |
| 2016/0117929 A1 | 4/2016 | Chan et al. | |
| 2016/0117933 A1 | 4/2016 | Chan et al. | |
| 2016/0159471 A1 | 6/2016 | Chan et al. | |
| 2016/0159472 A1 | 6/2016 | Chan et al. | |
| 2016/0214714 A1 | 7/2016 | Sekelsky | |
| 2016/0216304 A1 | 7/2016 | Sekelsky | |
| 2016/0272310 A1 | 9/2016 | Chan et al. | |
| 2016/0304199 A1 | 10/2016 | Chan et al. | |
| 2016/0315504 A1 | 10/2016 | Ichikawa | |
| 2017/0015414 A1 | 1/2017 | Chan et al. | |
| 2017/0015415 A1 | 1/2017 | Chan et al. | |
| 2017/0097435 A1 | 4/2017 | Hull et al. | |
| 2017/0110015 A1 | 4/2017 | Sekelsky | |
| 2017/0136880 A1 | 5/2017 | Ricci | |
| 2017/0136881 A1 | 5/2017 | Ricci | |
| 2017/0136882 A1 | 5/2017 | Ricci | |
| 2017/0136883 A1 | 5/2017 | Ricci | |
| 2017/0136885 A1 | 5/2017 | Ricci | |
| 2017/0136887 A1 | 5/2017 | Ricci | |
| 2017/0136888 A1 | 5/2017 | Ricci | |
| 2017/0136889 A1 | 5/2017 | Ricci | |
| 2017/0136890 A1 | 5/2017 | Ricci | |
| 2017/0136891 A1 | 5/2017 | Ricci | |
| 2017/0136892 A1 | 5/2017 | Ricci | |
| 2017/0136893 A1 | 5/2017 | Ricci | |
| 2017/0136894 A1 | 5/2017 | Ricci | |
| 2017/0136895 A1 | 5/2017 | Ricci | |
| 2017/0136896 A1 | 5/2017 | Ricci | |
| 2017/0136897 A1 | 5/2017 | Ricci | |
| 2017/0136902 A1 | 5/2017 | Ricci | |
| 2017/0136903 A1 | 5/2017 | Ricci | |
| 2017/0136904 A1 | 5/2017 | Ricci | |
| 2017/0136905 A1 | 5/2017 | Ricci | |
| 2017/0136907 A1 | 5/2017 | Ricci | |
| 2017/0136908 A1 | 5/2017 | Ricci | |
| 2017/0136910 A1 | 5/2017 | Ricci | |
| 2017/0136911 A1 | 5/2017 | Ricci | |
| 2017/0136912 A1 | 5/2017 | Ricci | |
| 2017/0140349 A1 | 5/2017 | Ricci | |
| 2017/0140603 A1 | 5/2017 | Ricci | |
| 2017/0141368 A1 | 5/2017 | Ricci | |
| 2017/0142872 A1 | 5/2017 | Ricci | |
| 2017/0154536 A1 | 6/2017 | Kreiner et al. | |
| 2017/0174205 A1 | 6/2017 | Ricci | |
| 2017/0207665 A1 | 7/2017 | Polu et al. | |
| 2017/0277187 A1 | 9/2017 | Refai et al. | |
| 2017/0336806 A1 | 11/2017 | Blanc-Paques et al. | |
| 2017/0343695 A1* | 11/2017 | Stetson | G01V 3/101 |
| 2017/0358950 A1 | 12/2017 | Zeine et al. | |
| 2018/0012504 A1* | 1/2018 | van Cruyningen | G05D 1/042 |
| 2018/0016027 A1 | 1/2018 | Cheatham, III et al. | |
| 2018/0032088 A1 | 2/2018 | van Cruyningen | |
| 2018/0043782 A1 | 2/2018 | Ng | |
| 2018/0072170 A1* | 3/2018 | Evans | B60L 53/60 |
| 2018/0086433 A1 | 3/2018 | Ichihara | |

(56) References Cited

U.S. PATENT DOCUMENTS

| | | | |
|---|---|---|---|
| 2018/0095468 A1* | 4/2018 | Yang | H02J 50/05 |
| 2018/0131440 A1 | 5/2018 | Patel et al. | |
| 2018/0149491 A1 | 5/2018 | Tayama | |
| 2018/0207684 A1 | 7/2018 | Miron et al. | |
| 2018/0211441 A1 | 7/2018 | Priest et al. | |
| 2018/0255465 A1 | 9/2018 | Priest et al. | |
| 2018/0346140 A1 | 12/2018 | Clemente et al. | |
| 2018/0357788 A1 | 12/2018 | Li et al. | |
| 2019/0023141 A1 | 1/2019 | Huang et al. | |
| 2019/0041856 A1 | 2/2019 | Hippelein et al. | |
| 2019/0143827 A1 | 5/2019 | Jaugilas | |
| 2019/0146462 A1 | 5/2019 | Tan et al. | |
| 2020/0412164 A1 | 12/2020 | Miller | |

FOREIGN PATENT DOCUMENTS

| | | |
|---|---|---|
| CN | 206514883 U | 9/2017 |
| EP | 2530813 A1 | 5/2012 |
| ES | 2660291 T3 | 3/2018 |
| WO | 9530557 A1 | 11/1995 |
| WO | 0149084 A2 | 7/2001 |
| WO | 03027683 A2 | 4/2003 |
| WO | 03050547 A2 | 6/2003 |
| WO | 2005013650 A2 | 2/2005 |
| WO | 2006047384 A2 | 5/2006 |
| WO | 2006083408 A1 | 8/2006 |
| WO | 2007149668 A3 | 12/2007 |
| WO | 2010026622 A1 | 3/2010 |
| WO | 2010150318 A1 | 12/2010 |
| WO | 2011156426 A3 | 12/2011 |
| WO | 2011163143 A1 | 12/2011 |
| WO | 2013126702 A1 | 8/2013 |
| WO | 2015191486 A1 | 12/2015 |
| WO | 2016089882 A1 | 6/2016 |
| WO | 2016122965 A1 | 8/2016 |
| WO | 2016122966 A1 | 8/2016 |
| WO | 2016190909 A3 | 12/2016 |
| WO | 2017011739 A1 | 1/2017 |
| WO | 2017083685 A1 | 5/2017 |
| WO | 2017083846 A1 | 5/2017 |
| WO | 2017083847 A1 | 5/2017 |
| WO | 2017083848 A1 | 5/2017 |
| WO | 2017083851 A1 | 5/2017 |

OTHER PUBLICATIONS

Huang et al. "Defining the Mutual Coupling of Capacitive Power Transfer for Wireless Power Transfer", Oct. 22, 2015, Electronics Letters, vol. 51 No. 22, pp. 1806-1807 (2 pages) (Year: 2015).

Lu, M., A. James and M. Bagheri, "Unmanned Aerial Vehicle (UAV) charging from powerlines." 2017 IEEE PES Asia-Pacific Power and Energy Engineering Conference (APPEEC), Bangalore, India, 2017, pp. 1-6, doi: 10.1109/APPEEC 2017.8308912, (6 pages) (Year 2017).

Vlemincq, Louis, "Implement a Spark-Gap-Based Design for Low-Cost Energy Harvesting", Electronic Design, Jul. 22, 2009, <http://www.electronicdesign.com/print/52523>, accessed Dec. 5, 2017 (5 pages).

Chang, Keunsu et al., "Electric Field Energy Harvesting Powered Wireless Sensors for Smart Grid". Journal of Electrical Engineering & Technology vol. 7, No. 1, pp. 75-80 <http://dx.doi.org/10.5370/JEET.2012.7.1.75>, 2012 (6 pages).

Rodriguez, Juan Carlos et al., "Energy Harvesting From Medium Voltage Electric Fields Using Pulsed Flyback Conversion", published in Power Electronics and Motion Control Conference (IPEMC-ECCE Asia), 2016 IEEE 8th International, <ieeexplore.ieee.org/abstract/document/7512871/?relaod=true>, Jul. 14, 2016 (1page).

Atherton, Kelsey D., "Tech Inspired By Nikola Tesla Charges Drones in Mid-Air", Popular Science, <https://www.popsci.com/nikola-tesla-inspired-tech-powers-drone-in-mid-air-using>, Oct. 21, 2016 (2 pages).

Leid, Fraser, "Drones, Reimagined", article in Drone Magazine. <www.dronemagazine.uk>, Dec. 22, 2015 (2 pages).

Li, Hongwei, "Energy Harvesting Device Based on Spatial Electric Field in Substation", Telkomnika, Indonesian Journal of Electrical Engineering, vol. 12, No. 6, pp. 4771-4777 DOI: 10.11591/telkomnika.v12i6.5521, Jun. 2014 (7 pages).

Lienhard, John H., "No. 2518 Annular Wings", Engines of Our Ingenuity, <https://www.uh.edu/engines/epi2518.htm>, accessed Sep. 27, 2017 (3 pages).

Guerra, Juan Carlos Rodriguez, "Electric Field Energy Harvesting From Medium Voltage Power Lines", School of Engineering, College of Science, Engineering and Health, RMIT University Australia, Feb. 2017 (208 pages).

* cited by examiner

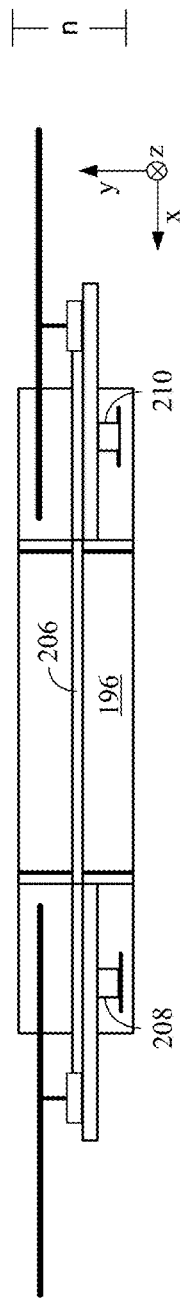
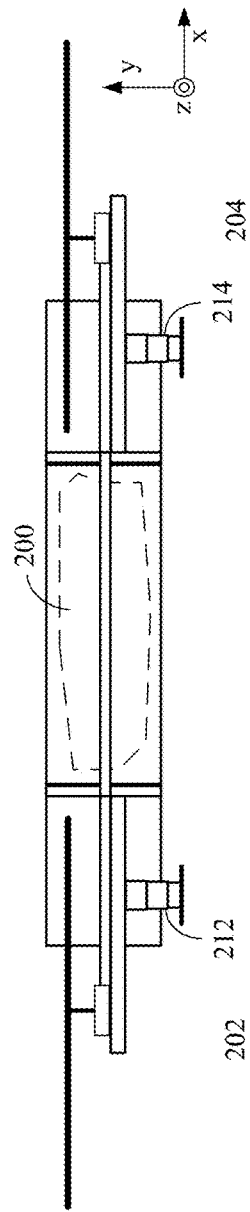
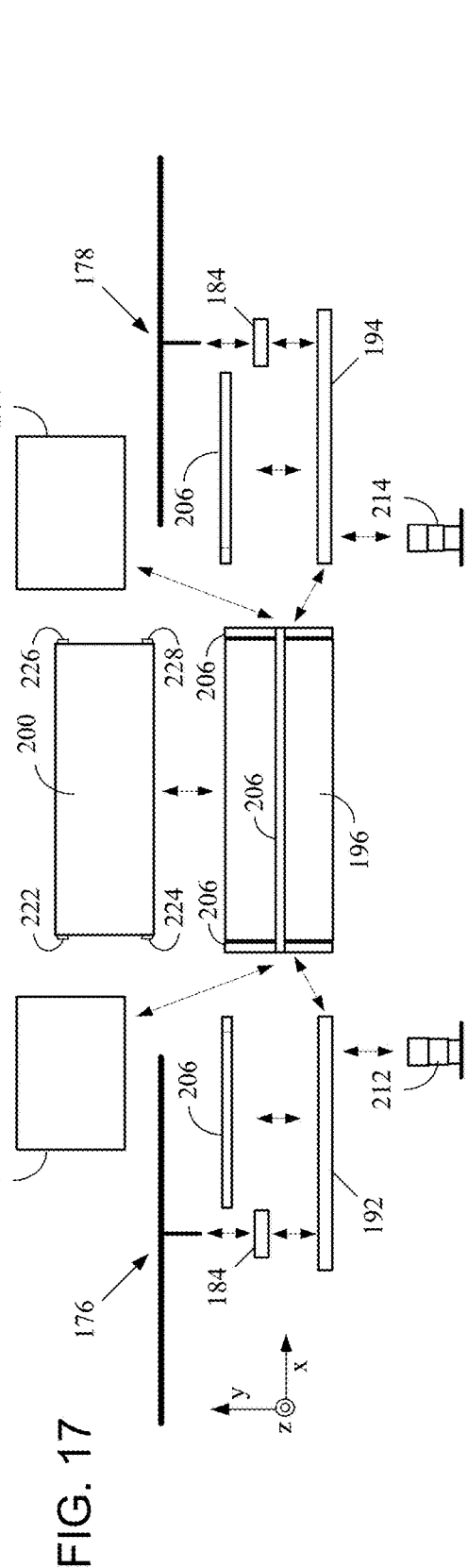
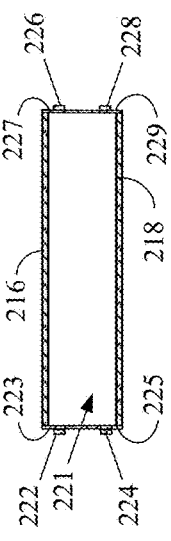
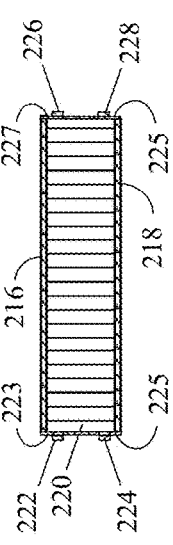

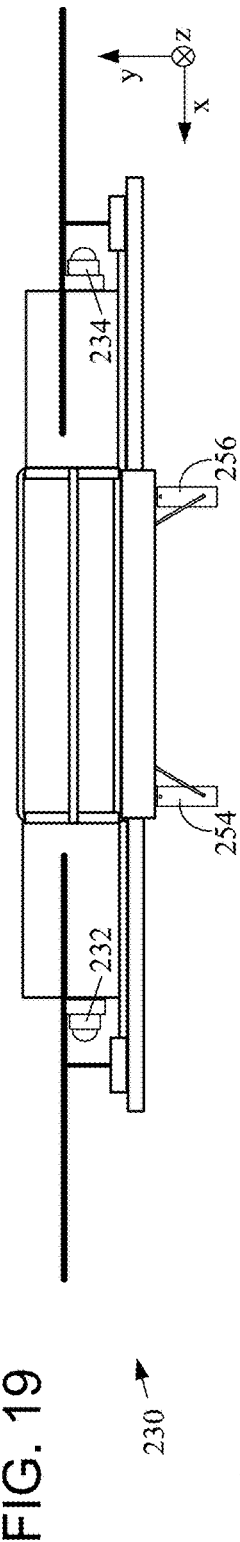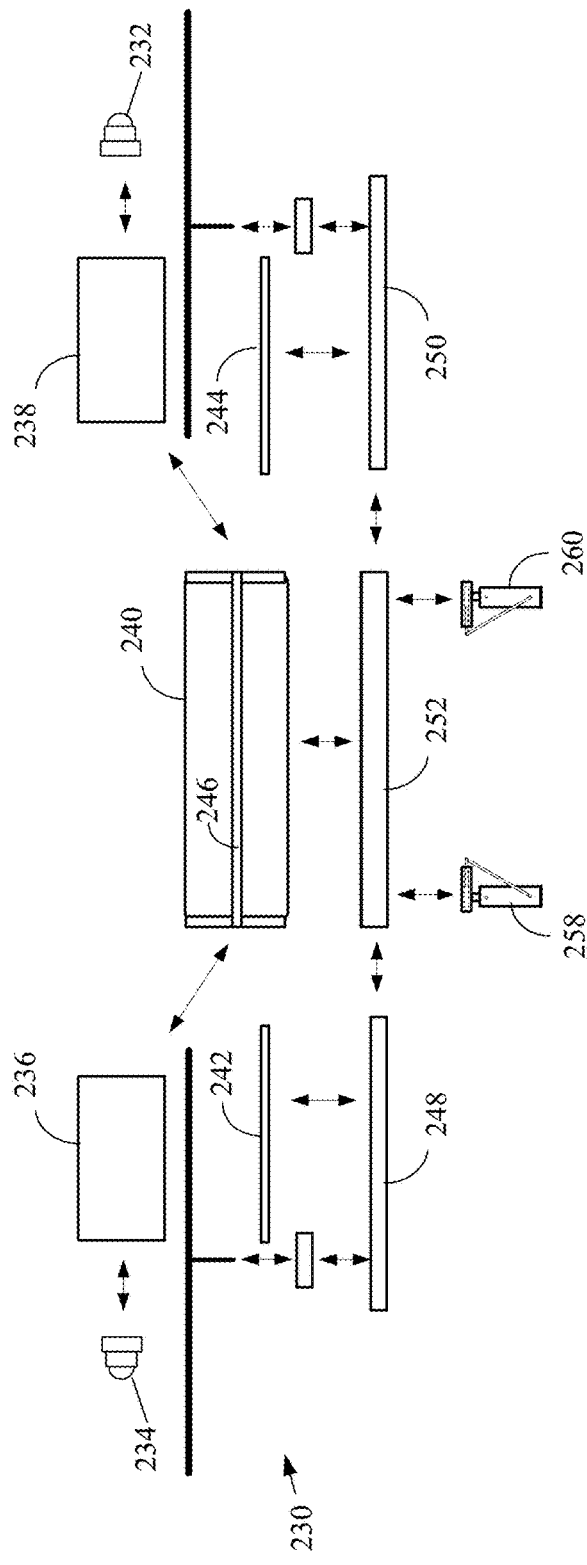

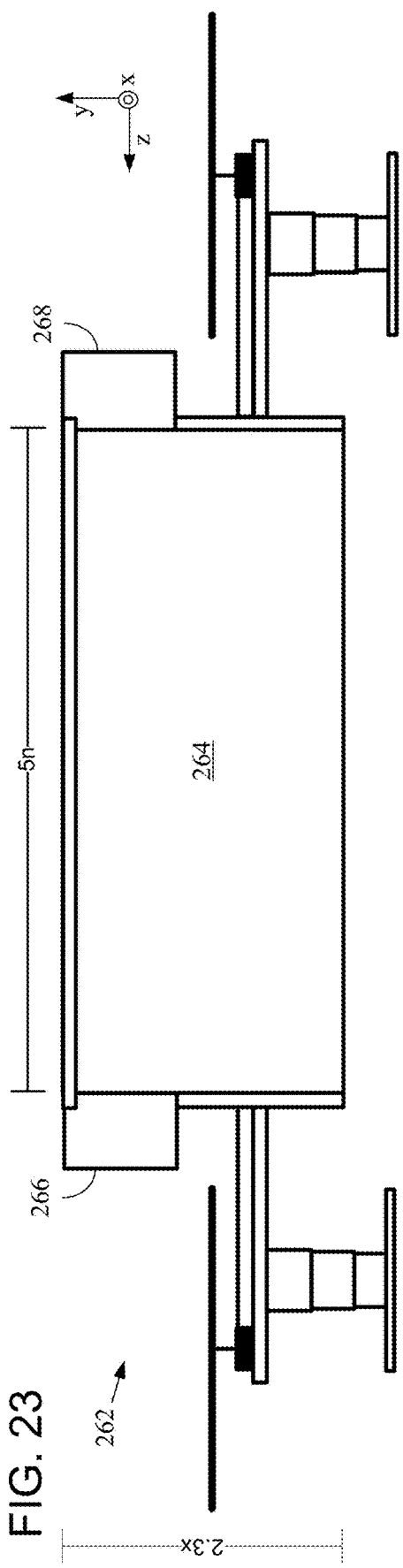
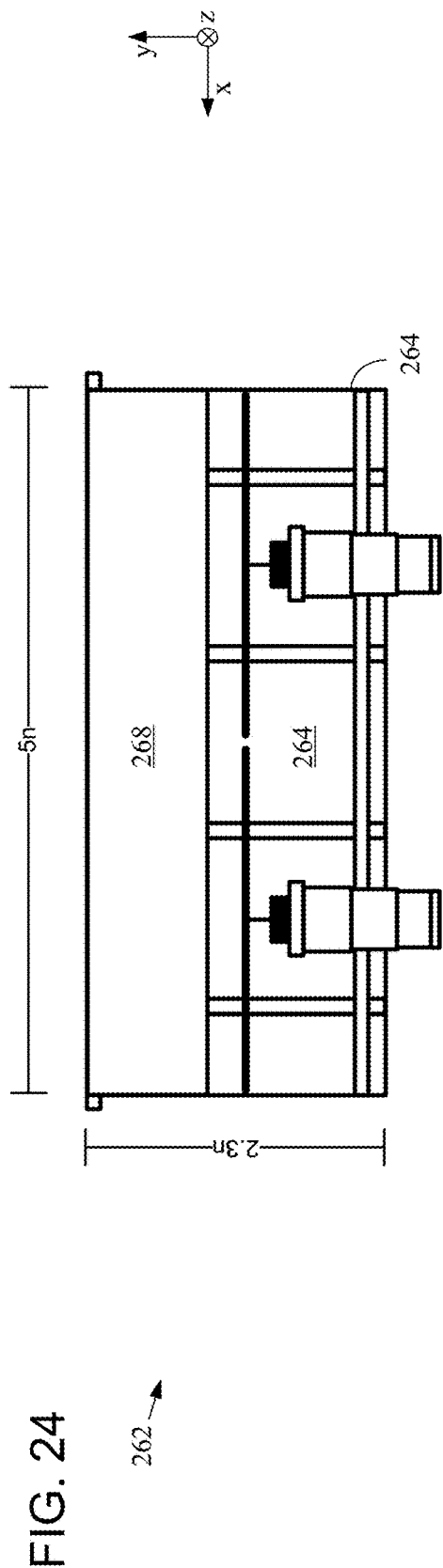

UAV AIRWAYS SYSTEMS AND APPARATUS

CROSS-REFERENCE TO RELATED APPLICATION

The present application is a nonprovisional patent application of, and claims priority under 35 U.S.C. § 119(e) to, U.S. provisional patent application 62/891,963, which is incorporated herein by reference. Furthermore, the disclosure of the '963 provisional application is set forth in the Appendix, which is incorporated herein by reference. The present application additionally incorporates herein by reference each of U.S. patent application Ser. No. 16/164,626 and U.S. Pat. No. 10,391,867 issuing from the '626 application, and terminology defined in the incorporated '626 application and '867 patent applies herein.

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The present invention generally relates to UAV airways systems and, in particular, to UAV airways that are defined along high-voltage power transmission lines of extant high-voltage transmission system in the United States (the "Grid").

The Grid is believed to comprise more than 450,000 circuit-miles of overhead transmission lines interconnecting the continental United States. The Grid operates at alternating-current voltages including 69 kV, 110 kV, 115 kV, 138 kV, 161 kV, 230 kV, 345 kV, 500 kV, and 765 kV, and the Grid connects and delivers power to and from hundreds of major and minor towns and cities, and to and from all states and provinces. The Grid also may be considered international, extending well into Canada—which country is an exporter of electricity, and even into Mexico.

FIG. 1 is a map 10 of part of the Grid in the United States. FIG. 2 is another map 20 of part of the Grid in the United States, which map 20 shows voltages of the various power transmission lines of the Grid. FIG. 3 is another map 30 of part of the Gird in the United States, which map 30 shows present and future power transmissions lines having a voltage of 765 kV.

The Grid in the United States—and most likely in other countries too—extends within physical "transmission rights-of-way" or "ROWs" that are intensively and assiduously patrolled, inspected, cleared, treated (e.g., arboricides), managed, and maintained by transmission owners and operators. This includes utility vegetation management. Any and all grounded objects, including virtually all trees and other vegetation, are cutback and prevented from physically approaching, impinging on, or contacting the Grid's transmission lines. Such contact would and does invariably cause system faults, trips, voltage sags like flickers and brownouts, outages like blackouts—such as the blackouts from August, 2003), and, more recently, fires and fire damage—such as the fires in California in 2007 and 2017-2018.

While all such efforts, practices, and programs by transmission owners and operators have, as their paramount objective, the prevention of such events, these efforts produce, maintain, and ensure—as an unplanned and unintended result—a narrow and yet remarkably clear, unobstructed, and very well-defined open spaces or corridors extending along the Grid. These corridors extend along the ROWs both under, to the left and right of, and over the transmission lines. Moreover, such corridors can be precisely identified in North America because the Grid is designed, built, and maintained to exacting, long-standing engineering and safety standards. The width and height of the open space to the left, and to the right, of the overhead conductors is a well-defined function of the line voltage; and the width and the height of the open space under the overhead conductors is a well-defined function of line voltage, structural height and spacing of the towers or other supports, insulator length, physical conductor catenary curves, and the minimum conductor-to-ground clearance requirement.

Recognizing the existence of these corridors, it is believed that a need exists making advantageous use of these corridors, which otherwise serve as dead space. One or more preferred embodiments of the invention are believed to provide such advantageous use.

SUMMARY OF THE INVENTION

The present invention includes many aspects and features. Moreover, while many aspects and features relate to, and are described in, the context of a UAV airways system generally, preferred embodiments of the present invention are believed to find particular use in UAV cargo transportation systems and in UAV surveillance and monitoring systems, especially as such systems overlay and are commensurate with the Grid, as will become apparent from the following summaries and detailed descriptions of aspects, features, and one or more embodiments of the present invention.

In a first aspect, a UAV airways system comprises a plurality of UAVs traveling along high-voltage power transmission lines within corridors, with one or more UAVs traveling in a first direction within one of said corridors and with one or more other UAVs traveling in a second direction opposite to the first direction within another of said corridors. One or more of the plurality of UAVs comprise a particular UAV in which electric power is generated for an electrical load from one or more differentials in electric field strength arising from the power transmission lines. In a feature, the particular UAV preferably comprises: (i) a plurality of separated electrodes; (ii) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced by the particular UAV arising from the power transmission lines, wherein the subsets of the set are interconnected such that the one or more voltage differentials between the subsets causes a current to flow through the electric circuit of the set for powering the electrical load; and (iii) a control assembly comprising: (A) one or more voltage-detector components configured to detect voltage differentials of the sets; and (B) a processor enabled to process the detected voltage differentials and—based thereon and based on voltage and electric current specifications for powering the electrical load—configure one or more of the electrical components in order to establish one of the plurality of different electric circuits for powering the electrical load.

In a feature, the corridors are predetermined and wherein the UAVs have information identifying the predetermined corridors whereby the UAVs are able to navigate within the predetermined corridors. The information identifying the predetermined corridors preferably identifies a direction of travel within each predetermined corridor, the direction of travel either being in the first direction or the second direction, and the information identifying the predetermined corridors preferably is maintained in a navigational database of each UAV.

In another aspect, a UAV airways system comprises: (a) a plurality of UAVs traveling along high-voltage power transmission lines within corridors, with one or more UAVs traveling in a first direction within one of said corridors and with one or more other UAVs traveling in a second direction opposite to the first direction within another of said corridors; (b) wherein one or more UAVs comprise a particular UAV in which electric power is generated for an electrical load from one or more differentials in electric field strength arising from the power transmission lines, the particular UAV comprising: (i) a plurality of separated electrodes; (ii) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced by the particular UAV arising from the power transmission lines, wherein the subsets of the set are interconnected such that the one or more voltage differentials between the subsets causes a current to flow through the electric circuit of the set for powering the electrical load; and (iii) a control assembly comprising (A) one or more voltage-detector components configured to detect voltage differentials of the sets; and (B) a processor enabled to process the detected voltage differentials and—based thereon and based on voltage and electric current specifications for powering the electrical load—configure one or more of the electrical components in order to establish one of the plurality of different electric circuits for powering the electrical load.

In a feature, the control assembly of the particular UAV configures one or more of the electrical components in order to establish one of the plurality of different electric circuits for powering the electrical load on a recurring basis when the particular UAV is in the vicinity of the power transmission lines.

In a feature, the control assembly of the particular UAV configures one or more of the electrical components in order to establish one of the plurality of different electric circuits for powering the electrical load on a recurring basis when the particular UAV moves while in the vicinity of the power transmission lines.

In a feature, a plurality of the subsets of electrodes of the particular UAV are electrically connected in series in at least one of the plurality of different electric circuits.

In a feature, a plurality of the subsets of electrodes are electrically connected so as to form a plurality of capacitors arranged in series in at least one of the plurality of different electric circuits.

In a feature, a plurality of the subsets of electrodes of the particular UAV are electrically connected so as to form a plurality of capacitors arranged in parallel in at least one of the plurality of different electric circuits.

In a feature, a subset of the particular UAV comprises electrodes electrically connected in parallel in at least one of the plurality of different electric circuits.

In a feature, an area of the plurality of electrodes in at least one of the plurality of different electric circuits of the particular UAV is less than or equal to 50% of an area of the set of electrodes in at least one other of the plurality of different electric circuits.

In a feature, an area of the plurality of electrodes in at least one of the plurality of different electric circuits of the particular UAV is less than or equal to 25% of an area of the set of electrodes in at least one other of the plurality of different electric circuits.

In a feature, an area of the plurality of electrodes in at least one of the plurality of different electric circuits of the particular UAV is less than or equal to 10% of an area of the set of electrodes in at least one other of the plurality of different electric circuits.

In a feature, the powerlines carry alternating electric current with a voltage of 69 kV.

In a feature, the powerlines carry alternating electric current with a voltage of 115 kV.

In a feature, the powerlines carry alternating electric current with a voltage of 137 kV.

In a feature, the powerlines carry alternating electric current with a voltage of 61 kV.

In a feature, the powerlines carry alternating electric current with a voltage of 230 kV.

In a feature, the powerlines carry alternating electric current with a voltage of 345 kV.

In a feature, the powerlines carry alternating electric current with a voltage of 500 kV.

In a feature, the powerlines carry alternating electric current with a voltage of 765 kV.

In a feature, the electrical load of the particular UAV comprises a rechargeable battery of the UAV.

In a feature, the electrical load of the particular UAV comprises a propulsion system of the UAV.

In a feature, the electrical load of the particular UAV comprises a navigation system of the UAV.

In a feature, the electrical load of the particular UAV comprises an electric motor of the UAV.

In a feature, the electrical load of the particular UAV comprises a camera of the UAV.

In a feature, the electrical load of the particular UAV comprises a transceiver of the UAV.

In another aspect, a UAV airways system comprises: (a) a plurality of UAVs traveling along high-voltage power transmission lines within corridors, with one or more UAVs traveling in a first direction within one of said corridors and with one or more other UAVs traveling in a second direction opposite to the first direction within another of said corridors; (b) wherein one or more UAVs each comprises a particular UAV comprising: (i) one or more electrical components; and (ii) a power supply unit; (iii) wherein the particular UAV defines a bay configured to removably receive the power supply unit for electrical coupling with the particular UAV, by which electrical coupling electric current is provided to the particular UAV by the power supply unit; (iv) wherein the power supply unit is configured to generate electric power from a differential in electric field strength when the power supply unit is received in the bay, electrically coupled with the particular UAV, and within a vicinity of powerlines; (v) wherein the power supply unit comprises a plurality of separated electrodes; and (vi) wherein the particular UAV further comprises, when the power supply unit is electrically coupled with the particular UAV, (A) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced when the particular UAV is within the vicinity of the powerlines, wherein the subsets of the set are interconnected such that the one or more voltage differentials between the subsets causes a current to flow through the electric circuit of the set for powering the particular UAV; (B) one or more sensors configured to sense data regarding voltage differentials of the sets; and (C) a processor configured to process the sensed data and, based thereon and based on voltage and electric current specifications for powering the particular UAV, configure one or more of the electrical components to establish one of the plurality of different electric circuits for powering the particular UAV.

In another aspect, a UAV airways system comprises: (a) a plurality of UAVs traveling along high-voltage power transmission lines within corridors, with one or more UAVs traveling in a first direction within one of said corridors and with one or more other UAVs traveling in a second direction opposite to the first direction within another of said corridors; (b) wherein one or more UAVs comprise a particular UAV in which electric power is generated for an electrical load from one or more differentials in electric field strength arising from the power transmission lines, the particular UAV comprising: (i) a plurality of separated electrodes; and (ii) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced by the UAV arising from the power transmission lines, wherein the subsets of the set are interconnected such that the one or more voltage differentials between the subsets causes a current to flow through the electric circuit of the set for powering the electrical load.

In a feature, the electrodes of the plurality of electrodes of the particular UAV are symmetrically arranged about an axis of the UAV.

In a feature, the electrodes of the plurality of electrodes of the particular UAV are symmetrically arranged about a center of the UAV.

In a feature, the electrodes of the particular UAV are encased in a nonmetallic material.

In a feature, the electrodes of the particular UAV are encased in a molded material.

In a feature, the electrodes of the particular UAV are encased in a nonconducting polymer material.

In a feature, the electrodes of the particular UAV are encased in a nonconducting plastic material.

In a feature, the electrodes of the particular UAV are encased in a nonconducting thermoplastic material.

In a feature, the electrodes of the particular UAV are encased in a nonconducting thermosetting material.

In a feature, the plurality of electrodes of the particular UAV is located in a block arrangement and define walls of the block.

In a feature, the electrodes of the particular UAV each comprises a planar rectangular surface.

In a feature, the electrodes of the particular UAV define inner surfaces of the block.

In a feature, the electrodes of the particular UAV define outer surfaces of the block.

In a feature, the plurality of electrodes of the particular UAV is located in an arrangement of nested blocks and defines walls of the blocks.

In a feature, the control assembly of the particular UAV is located within the innermost block.

In a feature, the plurality of electrodes of the particular UAV is located in a spherical arrangement and define wall of a sphere.

In a feature, the electrodes of the particular UAV each comprises a planar surface.

In a feature, the electrodes of the particular UAV each comprises a curved surface.

In a feature, the electrodes of the particular UAV define an inner surface of the sphere.

In a feature, each electrode of the particular UAV comprises a concave surface.

In a feature, the electrodes of the particular UAV define an outer surface of the sphere.

In a feature, each electrode of the particular UAV comprises a convex surface.

In a feature, a first pair of electrodes of the particular UAV is located along a first axis, a second pair of electrodes of the particular UAV is located along a second axis orthogonal to the first axis, and a third pair of electrodes of the particular UAV is located along a third axis orthogonal to each of the first axis and the second axis.

In a feature, the first, second, and third pairs of electrodes are arranged in a "jacks" formation.

In a feature, the origin point represents a midpoint between the electrodes of the first pair; wherein the origin point represents a midpoint between the electrodes of the second pair; and wherein the origin point represents a midpoint between the In a feature, the electrodes of the first pair are located a first distance apart; wherein the electrodes of the second pair are located a second distance apart; wherein the electrodes of the third pair are located a third distance apart; and wherein the first, second, and third distances are equal in length.

In a feature, the electrodes of the first pair are located a first distance apart; wherein the electrodes of the second pair are located a second distance apart; wherein the electrodes of the third pair are located a third distance apart; and wherein the first and second distances are unequal in length, the first and third distances are unequal in length, and the second and third distances are unequal in length.

In a feature, each electrode of the first pair is hemispheric in shape.

In a feature, each electrode of the first pair is planar in shape.

In a feature, the plurality of electrodes is located in an arrangement of concentric spheres and defines walls of the spheres.

In a feature, the control assembly is located within the innermost sphere.

In another aspect, a UAV airways system comprises: (a) a plurality of UAVs traveling along high-voltage power transmission lines within corridors, with one or more UAVs traveling in a first direction within one of said corridors and with one or more other UAVs traveling in a second direction opposite to the first direction within another of said corridors; (b) wherein one or more UAVs comprise a particular UAV in which electric power is generated for an electrical load from one or more differentials in electric field strength arising from the power transmission lines, the particular UAV comprising: (i) a plurality of separated electrodes; (ii) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced by the UAV arising from the power transmission lines, wherein the subsets of the set are interconnected such that the one or more voltage differentials between the subsets causes a current to flow through the electric circuit of the set for powering the electrical load; (iii) a control assembly comprising (i) one or more voltage-detector components configured to detect voltage differentials of the sets; and (ii) a processor enabled to process the detected voltage differentials and—based thereon and based on voltage and electric current specifications for powering the electrical load—configure one or more of the electrical components in order to establish one of the plurality of different electric circuits for powering the electrical load; (iv) one or more containment spaces extending between electrodes, the containment spaces each containing a hydrogen gas, containing a helium gas, or containing a vacuum.

In a feature, a said containment space contains a pressurized hydrogen gas or a pressurized helium gas.

In a feature, a said containment space contains means for heating a hydrogen gas or a helium gas, wherein the means comprises a spark gap or resistive heater.

In another aspect, a UAV airways system comprises: (a) a plurality of UAVs traveling along high-voltage power transmission lines within corridors, with one or more UAVs traveling in a first direction within one of said corridors and with one or more other UAVs traveling in a second direction opposite to the first direction within another of said corridors; (b) wherein one or more UAVs comprise a particular UAV comprising: (i) one or more electrical components; and (ii) a power supply unit; (iii) wherein the particular UAV defines a bay configured to removably receive the power supply unit for electrical coupling with the particular UAV, by which electrical coupling electric current is provided to the particular UAV by the power supply unit; (iv) wherein the power supply unit is configured to generate electric power from a differential in electric field strength when the power supply unit is received in the bay, electrically coupled with the particular UAV, and within a vicinity of the power transmission lines; (v) wherein the power supply unit comprises a plurality of separated electrodes; (vi) wherein one or more containment spaces extend between electrodes, the containment spaces each containing a hydrogen gas, containing a helium gas, or containing a vacuum; and (vii) wherein the particular UAV further comprises, when the power supply unit is electrically coupled with the particular UAV, (A) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced by the particular UAV arising from the power transmission lines, wherein the subsets of the set are interconnected such that the one or more voltage differentials between the subsets causes a current to flow through the electric circuit of the set for powering the particular UAV; (B) one or more sensors configured to sense data regarding voltage differentials of the sets; and (C) a processor configured to process the sensed data and, based thereon and based on voltage and electric current specifications for powering the particular UAV, configure one or more of the electrical components to establish one of In a feature, a said containment space contains a pressurized hydrogen gas or a pressurized helium gas.

In a feature, a said containment space contains means for heating a hydrogen gas or a helium gas, wherein the means comprises a spark gap or resistive heater.

In another aspect, a UAV airways system, comprises: (a) a plurality of UAVs traveling along high-voltage power transmission lines within corridors, with one or more UAVs traveling in a first direction within one of said corridors and with one or more other UAVs traveling in a second direction opposite to the first direction within another of said corridors; and (b) a plurality of charging stations located along the corridors for charging the UAVs, each charging station comprising (i) an interface for electric coupling with the UAV for charging of a rechargeable battery of the UAV; (ii) a power supply comprising first and second electrodes separated and electrically insulated from each other for enabling a differential in voltage at the first and second electrodes resulting from a differential in electric field strength experienced by the first and second electrodes arising from the power transmission lines; and (iii) electrical components electrically connected with the first and second electrodes and configured to establish a circuit with the rechargeable battery of the UAV when electronically coupled with the interface, wherein the differential in voltage between the first and second electrodes causes electric current to flow through the electric circuit for charging the battery of the UAV.

In a feature, the charging station is mounted to a support structure of the power transmission lines.

In a feature, the charging station is mounted to a tower of the power transmission lines.

In a feature, comprising a platform for landing of a UAV for charging.

In a feature, comprising one or more platforms for supporting multiple UAVs for charging.

In a feature, the interface projects outwardly from the power supply and is configured to couple with a UAV for charging while the UAV is hovering.

In another aspect, a UAV airways system comprises: (a) a plurality of UAVs traveling along high-voltage power transmission lines within corridors, with one or more UAVs traveling in a first direction within one of said corridors and with one or more other UAVs traveling in a second direction opposite to the first direction within another of said corridors, wherein at least some of the plurality of UAVs have rechargeable batteries with different voltage and current specifications; and (b) a plurality of charging stations located along the corridors for charging the UAVs, each charging station comprising (i) a plurality of different interfaces each for electric coupling with a UAV for charging of a rechargeable battery of the UAV, each different interface corresponding to different voltage and current specifications; (ii) a power supply comprising a plurality of electrodes and electrical components electrically connected with the plurality of electrodes and configurable to establish each of a plurality of electric circuits, each of the electric circuits comprising one of the plurality of the interfaces and a set of two or more mutually exclusive subsets of the plurality of electrodes, the electrodes in each subset that have more than one electrode being electrically connected with each other for avoiding any voltage differential therebetween, and the one or more electrodes of each subset being electrically insulated from each electrode of any other subset of the set for enabling one or more voltage differentials between the subsets of the set, wherein the subsets are interconnected in each particular electric circuit such that the one or more voltage differentials therebetween causes a current to flow through the particular electric circuit for charging through the interface the rechargeable battery; and (iii) a control assembly comprising a processor enabled to configure one or more of the electrical components to establish a particular one of the electric circuits based on the voltage and current specifications of the interface with which a UAV is electrically coupled for charging; whereby the charging station is able to charge UAVs having rechargeable batteries with different voltage and current specifications.

In another aspect, a UAV airways system comprises: (a) a plurality of UAVs traveling along high-voltage power transmission lines within corridors, with one or more UAVs traveling in a first direction within one of said corridors and with one or more other UAVs traveling in a second direction opposite to the first direction within another of said corridors, wherein at least some of the plurality of UAVs have rechargeable batteries with different voltage and current specifications; and (b) a plurality of charging stations located along the corridors for charging the UAVs, each charging station comprising (i) an interface for electric coupling with a UAV for charging of a rechargeable battery thereof; (ii) a power supply comprising a plurality of electrodes and electrical components electrically connected with the plurality of electrodes and configurable to establish each of a plurality of electric circuits, each of the electric circuits comprising the interface and a set of two or more mutually exclusive subsets of the plurality of electrodes, the electrodes in each subset that have more than one electrode being electrically connected with each other for avoiding any voltage differential therebetween, and the one or more electrodes of each subset being electrically insulated from each electrode of any other subset of the set for enabling one or more voltage differentials between the subsets of the set, wherein the subsets are interconnected in each particular electric circuit such that the one or more voltage differentials therebetween causes a current to flow through the particular electric circuit for charging through the interface the rechargeable battery; and (iii) a control assembly comprising a processor enabled to configure one or more of the electrical components to establish a particular one of the electric circuits based on the voltage and current specifications of the rechargeable battery; whereby the charging station is able to charge UAVs having rechargeable batteries with different voltage and current specifications.

In a feature, a UAV further comprises a transceiver by which the control assembly receives from the UAV information identifying to the charging station the voltage and current specifications of the rechargeable battery of the UAV to be charged.

In a feature, a UAV further comprises a sensor operatively connected with the control assembly for identifying the voltage and current specifications of the rechargeable battery of the UAV to be charged. The sensor preferably comprises a camera, a barcode scanner, or an RFID reader.

In some preferred embodiments, the UAV airways system comprises a cargo transportation system, wherein UAVs carry cargo for transport. Cargo may comprise packages and mail, and even Amazon Prime deliveries.

In some preferred embodiments, the UAV airways system comprises a monitoring and surveillance system for monitoring and surveying the ROWs, the power transmission lines, and the towers and supporting structures of the Grid. Such systems would supplement or even replace the surveillance and monitoring that is commonly done by transmission owners and operators, which includes "driving the lines" or manually flying along the lines for direct visual inspection, which can be very expensive.

In some preferred embodiments, the UAV airways system extends across several states of the United States.

In some preferred embodiments, the UAV airways system extends between California and New York.

In some preferred embodiments, the UAV airways system extends between California and Texas.

In some preferred embodiments, the UAV airways system extends between New York and Texas.

In some preferred embodiments, UAVs travel in the first direction in a first corridor and UAVs travel in the second direction in a second corridor that extends in parallel with the first corridor and wherein the first corridor and the second corridor are located at an elevation below the power transmission lines.

In some preferred embodiments, UAVs travel in the first direction in first and second corridors and UAVs travel in the second direction in third and fourth corridors, wherein the first, second, third, and fourth corridors extend in parallel along the power transmission lines, and wherein the first and the third corridors are located at an elevation below the power transmission lines and the second and fourth corridors are located at an elevation above the power transmission lines.

Still additional aspects and features are disclosed in the incorporated references.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings.

FIG. 15 is a first side schematic view of the quadcopter 170 of FIG. 14.

FIG. 16 is a second side schematic view of the quadcopter 170 of FIG. 14, which side is opposite to the side of FIG. 15.

FIG. 17 is an exploded view of the quadcopter 170 seen in FIG. 16.

FIG. 18 is a cross-sectional view of the EFA generator of the quadcopter 170 taken along lines 18-18 of FIG. 14.

FIG. 18a is a cross-sectional view of an alternative to the EFA generator seen in FIG. 18.

FIG. 19 is a first side schematic view of another quadcopter 230.

FIG. 20 is a second side schematic view of the quadcopter 230, which side is opposite to the side of FIG. 19.

FIG. 21 is an exploded view of the quadcopter 230 seen in FIG. 20.

FIG. 23 is a first side schematic view of the quadcopter 262, wherein the quadcopter is in a landed configuration.

FIG. 24 is a rear schematic view of the quadcopter 262 in the landed configuration.

DETAILED DESCRIPTION

Figure 1:
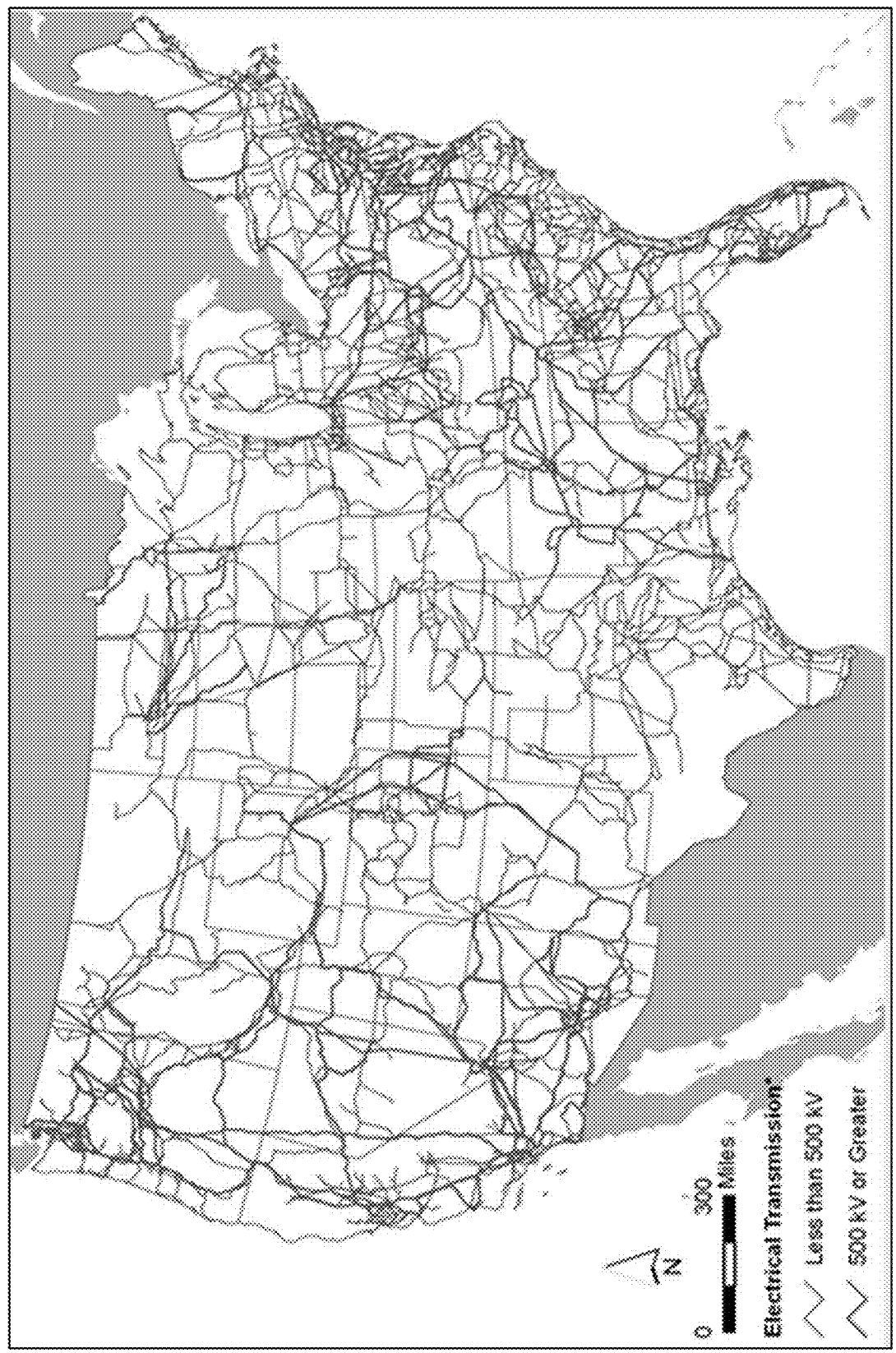
FIG. 1 is a map of the Grid in the United States, which map corresponds to routes of UAVs in at least some preferred embodiments of UAV airways systems in accordance with one or more aspects and features of the invention.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

In particular, one or more preferred embodiments of the invention advantageously utilize the aforementioned corridors by utilizing such corridors as flightpaths for UAVs. In this respect, these corridors of the Grid then become routes of the UAVs, with the Grid and subsets thereof becoming UAV airways.

For example, FIG. 1 is a map 10 of part of the Grid in the United States, which map 10 corresponds to routes of UAVs in at least some preferred embodiments of UAV airways systems in accordance with one or more aspects and features of the invention. In other words, the map 10 of the Grid represents routes along which UAVs may travel.

Figure 2:
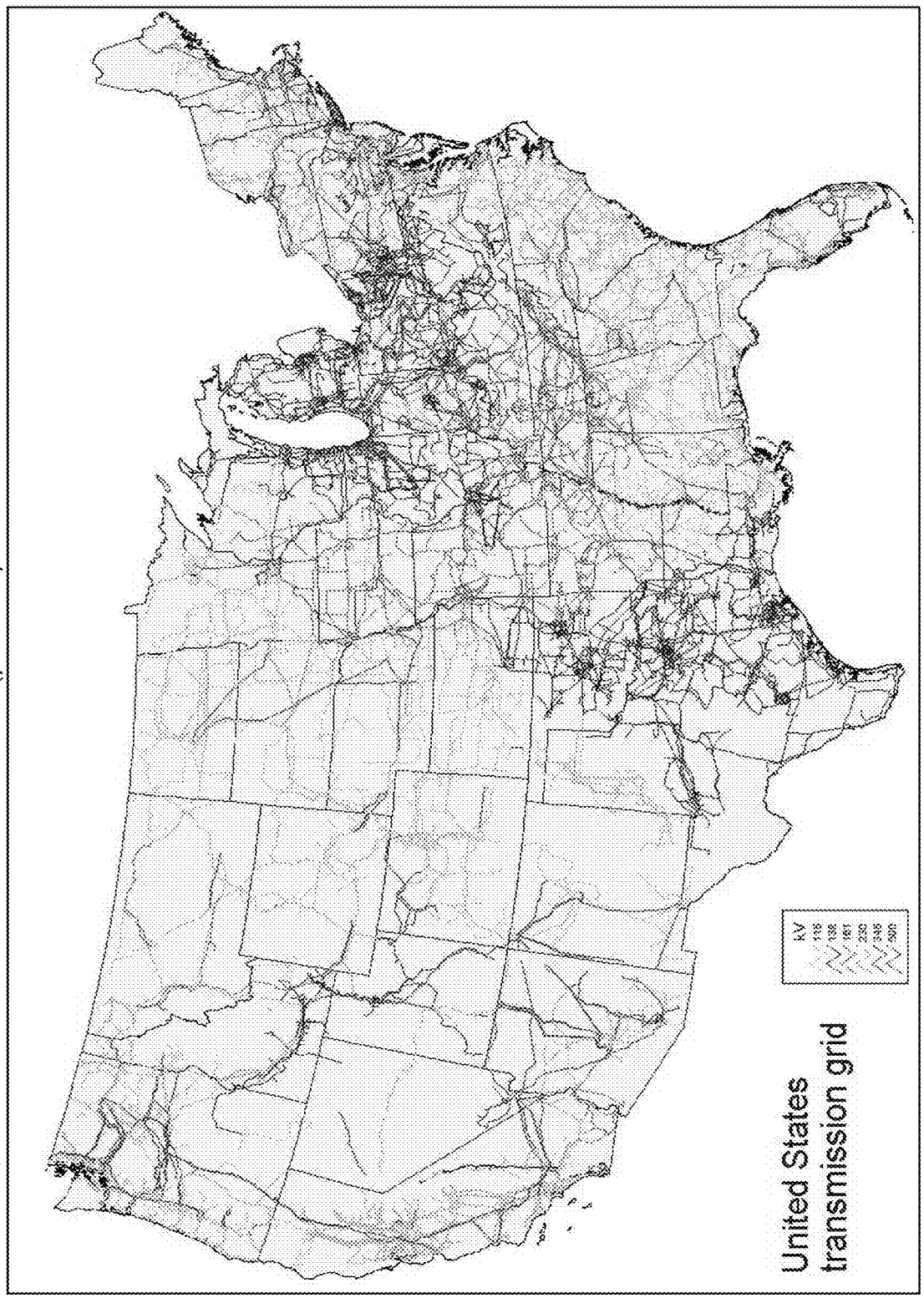
FIG. 2 is another map of the Grid in the United States, which map shows voltages of the various power transmission lines of the Grid. Preferred embodiments of UAV airways systems in accordance with one or more aspects and features of the invention have routes corresponding to the power transmission lines of FIG. 2 that have the same voltages, and other preferred embodiments of UAV airways systems in accordance with one or more aspects and features of the invention have routes corresponding to the possible different combinations of the power transmission lines of FIG. 2 that have different voltages.

FIG. 2 is another map 20 of part of the Grid in the United States, which map 20 shows voltages of the various power transmission lines of the Grid. Preferred embodiments of UAV airways systems in accordance with one or more aspects and features of the invention have routes corresponding to the power transmission lines of FIG. 2 that have the same voltages, and other preferred embodiments of UAV airways systems in accordance with one or more aspects and features of the invention have routes corresponding to the possible different combinations of the power transmission lines of FIG. 2 that have different voltages.

Figure 3:
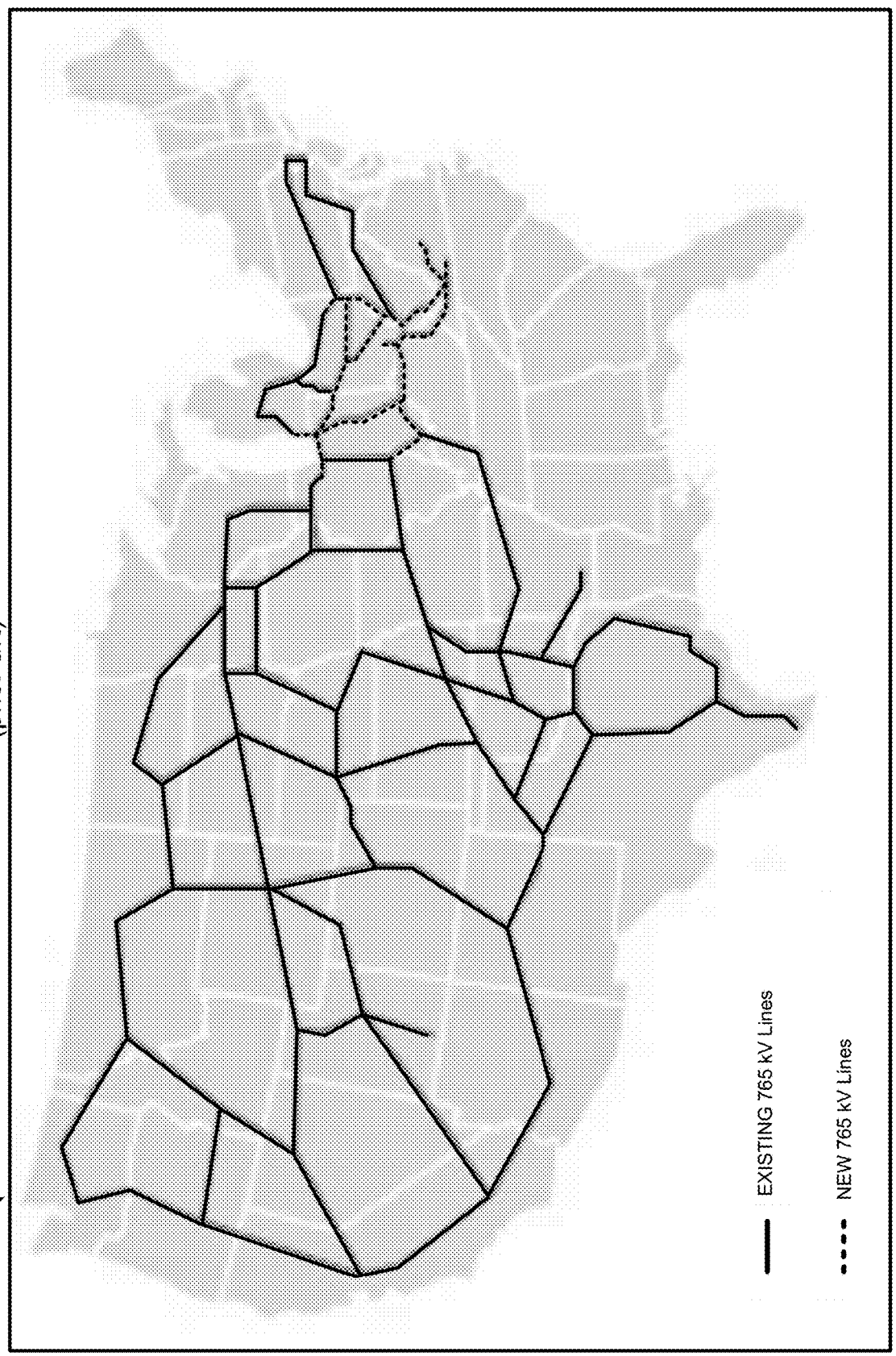
FIG. 3 is another map of the Gird in the United States, which map shows present and future power transmissions lines having a voltage of 765 kV. This map of FIG. 3 corresponds to routes of UAVs in at least some preferred embodiments of UAV airways systems in accordance with one or more aspects and features of the invention.

Similarly, FIG. 3 is another map 30 of part of the Gird in the United States, which map 30 shows present and future power transmissions lines having a voltage of 765 kV. This map of FIG. 3 corresponds to routes of UAVs in at least some preferred embodiments of UAV airways systems in accordance with one or more aspects and features of the invention.

Figure 4:
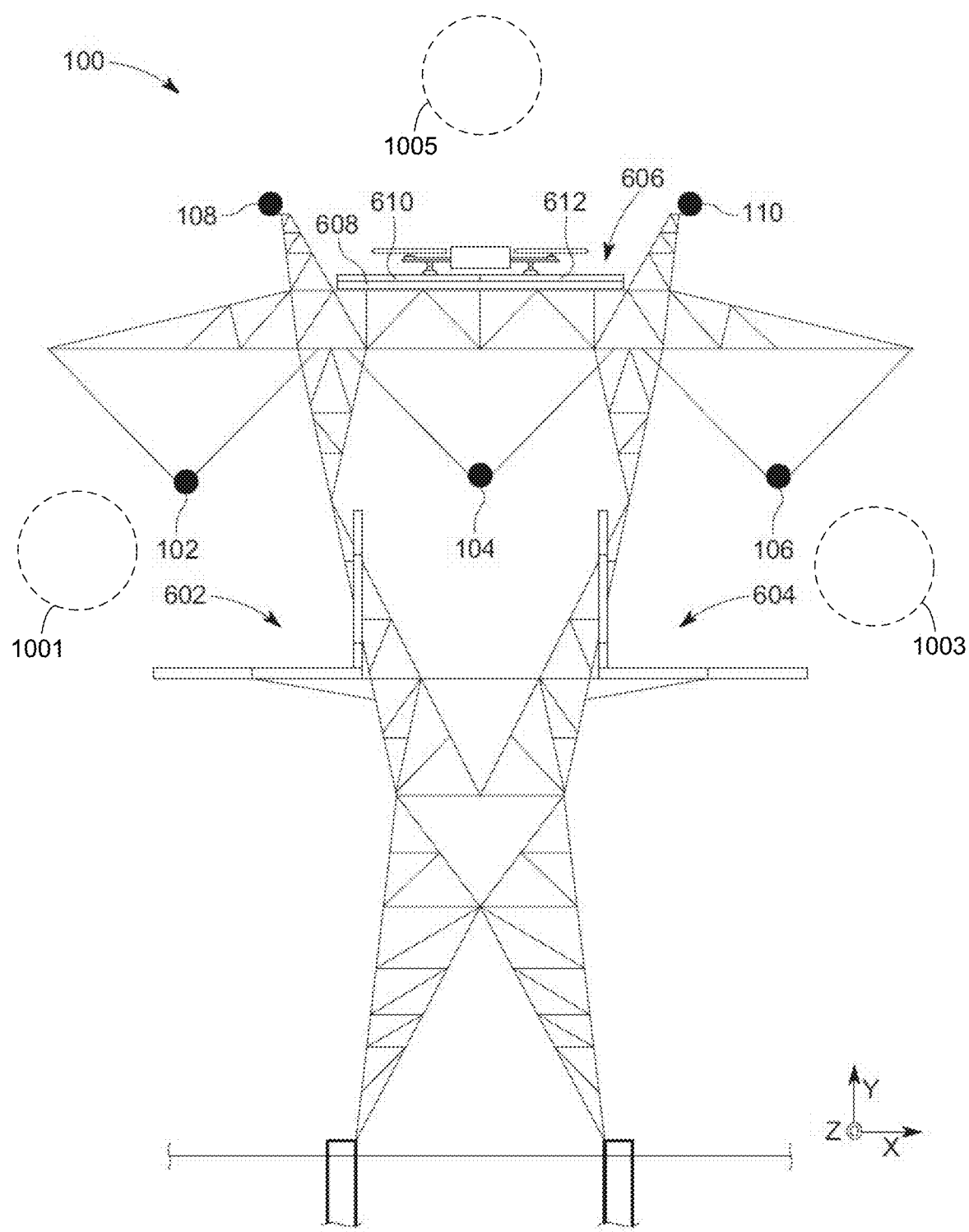
FIG. 4 schematically illustrates charging stations in at least some preferred embodiments of UAV airways systems in accordance with one or more aspects and features of the invention.

FIG. 4 schematically illustrates charging stations in at least some preferred embodiments of UAV airways systems in accordance with one or more aspects and features of the invention. The incorporated disclosures are referred to for a detailed description of that shown in FIG. 4, wherein the callout reference numbers used—with the exception of 1001,1003,1005—are the same as those used in the '626 application and '867 patent.

Specifically, exemplary powerline transmission tower 100 seen in FIG. 4 comprises three conducting lines 102,104, 106, each of which is out of phase with the others; and two shield wires 108,110. Charging stations 602,604,606 are supported on the tower 100 and may be mounted to the tower 100 using brackets.

Each of charging station 602,604,606 when mounted within the vicinity of power transmission lines utilizes a respective EFA generator for charging a UAV. This is accomplished through an interface of each of the charging stations 602,604,606. The interface schematically illustrated in FIG. 4 comprises a landing platform for a UAV that is formed by two electrically insulated conducting plates preferably in the form of metallic plates that serve as electric terminals upon which the UAV lands Two such exemplary metallic plates are called out in FIG. 4, namely, metallic plates 610,612 of a landing platform of the charging station 606. The feet of a UAV each preferably includes an electric terminal for electrically coupling with a respective metallic plates 610,612, and the UAV lands such that each of the feet contacts only a respective one of the metallic plates 610,612. The EFA generator of the charging station 606 comprises a set of one or more electrodes contained within the main housing 608, which housing is seen located under the metallic plates 610,612 of the landing platform.

If a plurality of electrodes is included in the set, then the plurality of electrodes preferably is configurable such that two or more of the electrodes are electrically connected so that a voltage differential is not maintained between them, thereby joining and functioning as a larger electrode. The set is connected to one of the metallic plates—for example plate 610—of the landing platform, and the second metallic plate 612 is connected to a ground of the tower 100. In such scenario, the EFA generator preferably includes electrical components arranged to handle significantly large voltage differentials. Alternatively, neither metallic plate may be connected to a ground of the tower 100; charging stations 602,604 are representative of such alternative. Further details of these charging stations are set forth in the incorporated disclosures of the '626 application and '867 patent, to which reference is made.

Figure 5:
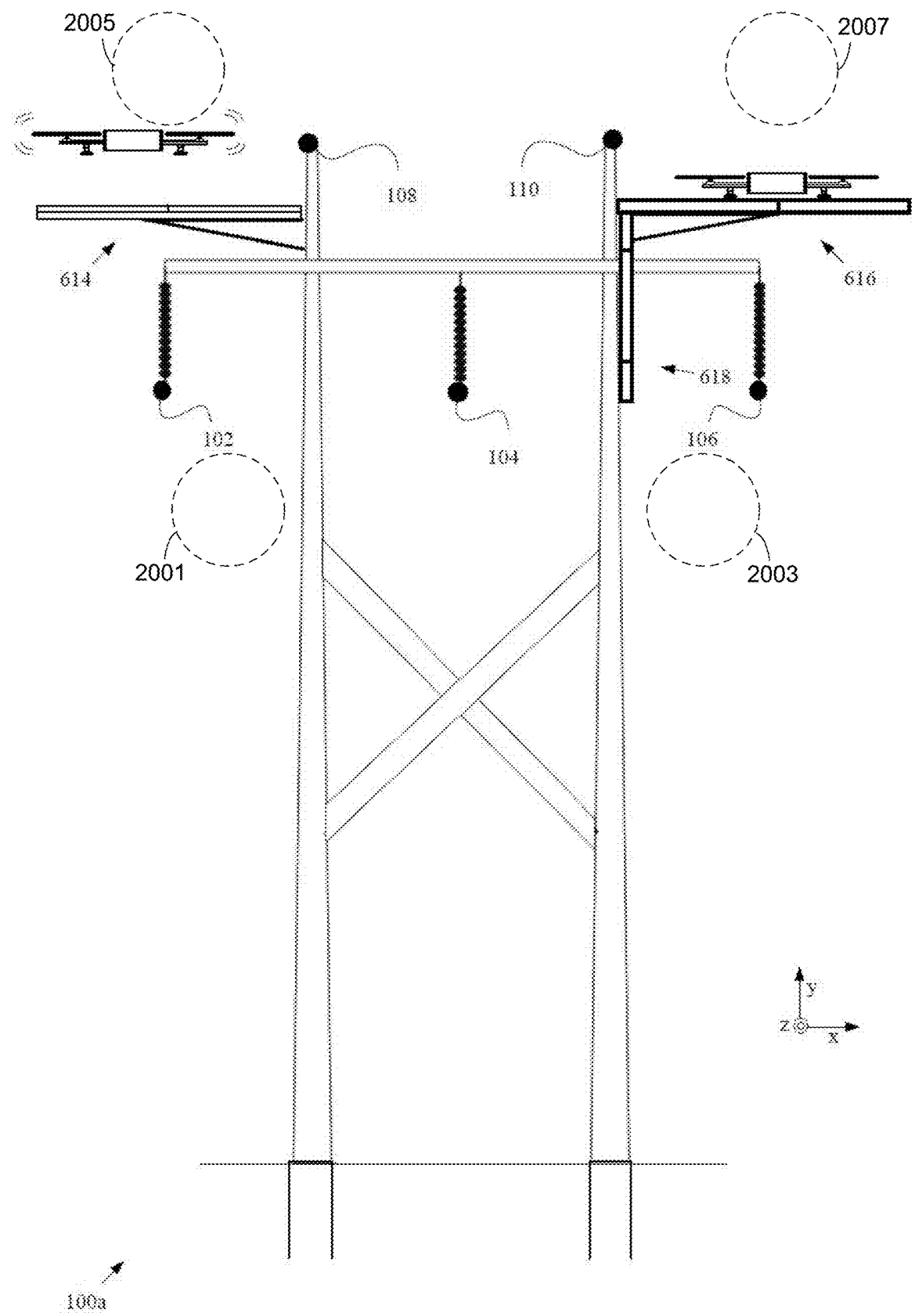
FIG. 5 schematically illustrates charging stations in at least some preferred embodiments of UAV airways systems in accordance with one or more aspects and features of the invention.

Like FIG. 4, FIG. 5 schematically illustrates charging stations in at least some preferred embodiments of UAV airways systems in accordance with one or more aspects and features of the invention. The incorporated disclosures are referred to for a detailed description of that shown in FIG. 5, wherein the callout reference numbers used—with the exception of 2001,2003,2005,2007—are the same as those used in the '626 application and '867 patent.

Specifically, exemplary powerline transmission tower 100a includes conducting lines 102,104,106 and shield lines 108,110. Two charging station 614,616 are shown supported on tower 100b. Charging station 614 is similar in design to charging station 606 of FIG. 4; the EFA generator of charging station 614 is shown extending underneath the landing platform and preferably is connected to a ground of the tower 100a. Regarding charging station 616, the EFA generator 618 of charging station 616 is not connected to ground and is shown extending downwardly; this is in contrast to the EFA generators of each of charging stations 602,604 seen in FIG. 4, which is shown extending upwardly.

Figure 6:
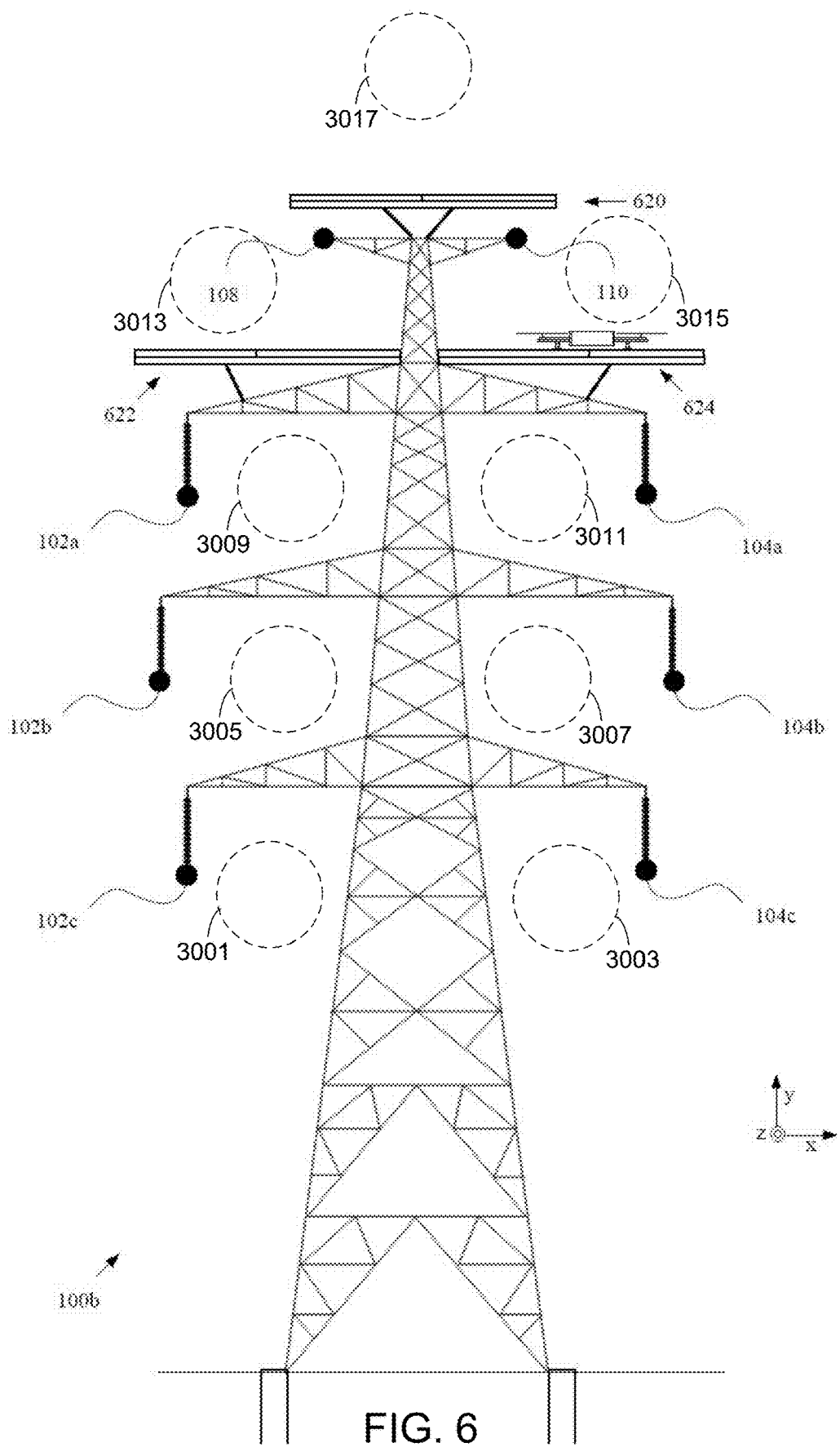
FIG. 6 schematically illustrates charging stations in at least some preferred embodiments of UAV airways systems in accordance with one or more aspects and features of the invention.

FIG. 6 also schematically illustrates charging stations in at least some preferred embodiments of UAV airways systems in accordance with one or more aspects and features of the invention. The incorporated disclosures are referred to for a detailed description of that shown in FIG. 6, wherein the callout reference numbers used are the same as those used in the '626 application and '867 patent.

Specifically, exemplary powerline transmission tower 100b includes six conducting lines comprising conducting lines 102a,104a; conducting lines 102b,104b; and conducting lines 102c,104c. Tower 100b also includes shield lines 108,110. Three charging station 620,622,624 are shown supported on tower 100b. Charging station 620 is similar in design to charging station 606 of FIG. 4 supported on tower 100, and each of charging stations 622,624 is similar in design to charging station 614 of FIG. 5 supported on tower 100a.

Exemplary corridors for UAVs are additionally illustrated as dashed circles in FIGS. 4, 5, and 6, which corridors are not disclosed or illustrated in the incorporated disclosure of the '626 application and '867 patent. Corridors 1001,1003, 1005 are illustrated in FIG. 4; corridors 2001,2003,2005, 2007 are illustrated in FIG. 4; and corridors 3001,3003, 3005,3007,3009,3011,3013,3015,3017 are illustrated in FIG. 4.

The variances in the electric field strength along each corridor arising from the power transmission lines preferably is great enough to meet the power requirements of the UAVs traveling along such corridor. It will be appreciated from the incorporated disclosure that the various corridors illustrated in the drawings will have different variances in the electric field strength and that all corridors certainly will not necessarily be the same in the electric field strength variances experienced therein. It is contemplated that the best corridors for a particular purpose and type of UAV will be identified using field data.

Properly designed and equipped UAVs, which include for example drones and unmanned aerial systems, can operate in and within such corridors. These corridors extend along the ROWs both under, to the left and right of, and over the transmission lines, and there is virtually no chance of encountering or striking an obstacle or object by a UAV flying within these corridors. When equipped with high-accuracy GPS and GLONASS receivers, such UAVs can easily avoid all physical towers and other structures of the Grid, such as shield wires, insulators, and the high voltage transmission conductors or physical lines themselves, all of which are extensively mapped, scanned, and located with LiDAR and GPS, with centimeter-scale locational, spatial, and dimensional resolution and accuracy. Indeed, such corridors can be precisely identified in North America because the Grid is designed, built, and maintained to exacting, long-standing engineering and safety standards. The width and height of the open airspace to the left, and to the right, of the overhead conductors is a well-defined function of the line voltage; and the width and the height of the open airspace under the overhead conductors is a well-defined function of line voltage, structural height and spacing of the towers or other supports, insulator length, physical conductor catenary curves, and the minimum conductor-to-ground clearance requirement.

In accordance with preferred embodiments of the invention, such properly designed and equipped UAVs incorporate and use electric-field actuated generators or "EFA" generators of the incorporated references. The EFA generator is intended to be used within an environment having inhomogeneous electric fields, wherein differentials in electric field strengths are sufficiently great so as to power the intended object with an electric field actuated (EFA) generator.

In preferred embodiments, the environment comprises a vicinity of powerlines, and especially a vicinity of three-phase alternating current powerlines, such as those used by electric and utility companies for electric power transmission. At least in the United States, such powerlines usually are three-phase AC and typically have voltages of between 69 kV and 765 kV, including 69 kV, 110 kV, 115 kV, 138 kV, 161 kV, 230 kV, 345 kV, 500 kV, and 765 kV. In some preferred embodiments, the EFA generators power the UAVs including the propulsion systems, and in some preferred embodiments the UAVs charge batteries of the UAVs. In some preferred embodiments, the EFA generators power systems of the UAVs as well as charge batteries of the UAVs.

Of course, such properly designed and equipped UAVs also preferably comprise cargo-carrying capabilities, which may comprise interior spaces enclosed for cargo storage and transport or a structures for holding and securing cargo on, under, or otherwise supported by UAVs. Such UAVs further may comprise cameras and other monitoring and surveillance equipment.

Other UAVs may utilize these corridors, too, and charging stations of the incorporated disclosure may located along the power transmission lines for charging, inter alia, such other UAVs. The charging stations in this case preferably utilize EFA generators for charging the UAVs, which preferably include rechargeable batteries In some preferred embodiment, the UAV to overhead conductor proximity is no less than 2.5 meters and no greater than 25 meters, with 3 to 4 meter proximity being most preferred, in that such distance is believed to (a) ensure in-flight operational safety, with respect to the overhead conductors; (b) maximize on-board UAV electric power generation using EFA generators; and (c) avoid and preclude, with virtually absolute certainty, any physical interaction (collision or impact) with any vegetation, or other object, that has moved into, fallen into, been driven into, or has grown into the required clear space of the ROWs.

Because of the use of EFA generators, UAVs are capable of intercity, interstate, inter-province, cross-country, and international travel within the preferred UAV airways systems of the invention.

One or more commercial, governmental, and/or military carriers/operators preferably establishes, maintains, and operates UAV airways facilities that are located proximal to the power transmission lines, such that the UAVs can be monitored, tracked, routed, serviced, maintained, replaced, and loaded/offloaded efficiently, and so that their cargo can be quickly and efficiently routed to/from appropriate ground transportation. Such facilities also preferably conduct and maintain weather tracking and forecasting, airspace monitoring and management, UAV flight planning, tracking, and monitoring, and both facility-to-facility and UAV-to-facility communications.

Such facilities also preferably are be located and operated close to ROWs, contiguous to ROWs, or even within ROWs, astride the overhead conductors on one side, or on both sides. In some preferred embodiments, a facility is constructed within the ROW and is comprised of the physical sections: one multistory structure astride the overhead conductors to the left; one multistory structure astride the overhead conductors to the right; and an open aircraft hanger-like structure, with bi-directional access (UAV entrance/exit) located well above the conductors, shield wires, and/or transmission tower structures, sitting atop, joined to, and supported by the left and right multistory structures. A single multistory structure, topped by an open aircraft hanger-like structure, with bi-directional access (UAV entrance/exit), located astride the overhead conductors to the left, or astride the overhead conductors to the right, also could serve the same purposes; likewise, a pair of multistory structures, each topped by an open aircraft hanger-like structure, with bi-directional access (UAV entrance/exit), one located astride the overhead conductors to the left, and one located astride the overhead conductors to the right, could serve the same purposes. It is contemplated that such facilities would not likely need to be constructed and located at separations of less than 10 or 20 miles, and could well only be required every 20 to 200 miles.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

For example, UAVs of the transportation systems of the invention can be equipped with cameras and other surveillance equipment for purposes of monitoring the Grid, both for maintenance purposes and for security. Such equipped UAVs can even be used outside of a transportation system but still operated within the corridors of the Grid for the sole purpose of maintenance and/or security of the Grid, wherein such UAVs need not include any cargo-carrying capabilities.

Figure 7A:
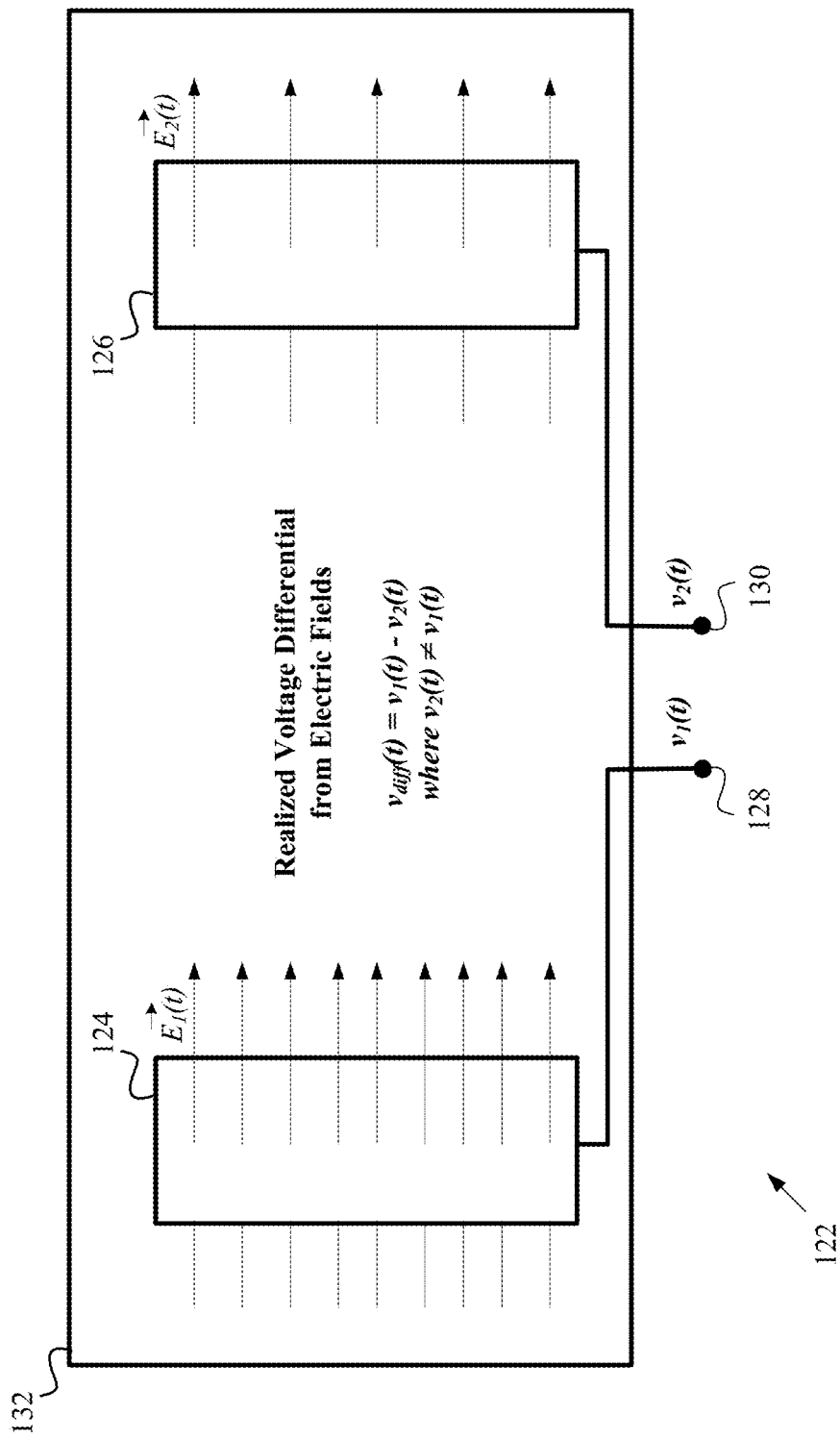
FIG. 7a illustrates a basic, schematic representation of an EFA generator in accordance with one or more embodiments of the invention.

Turning now to more specific details of preferred UAVs that are operated within the corridors of the present invention and, in particular, within an environment comprising a vicinity of powerlines, and especially a vicinity of three-phase AC powerlines such as those used by electric companies and utility companies for electric power transfer in the United States, a basic, schematic representation of an EFA generator 122 in accordance with one or more embodiments of the invention is illustrated in FIG. 7a. The EFA generator 122 comprises a first electrode 124 and a second electrode 126. The EFA generator 122 may be contained within an enclosure 132 so as to form a power supply unit for use with apparatus having a receptacle for removably receiving the power supply unit, whereby power supply units may be readily changed in such apparatus. Alternatively, the EFA generator 122 may form an integrated power supply in an apparatus and be contained within an enclosure of the apparatus itself. In any of these scenarios, the first and second electrodes 124,126 are arranged such that these electrodes experience electric fields $E_1(t)$ and $E_2(t)$ that result in a net differential voltage therebetween equal to $v_1(t)-v_2(t)$ where $v_1(t)$ is not equal to $v_2(t)$. The voltage differential resulting from the electric field strength differential can be realized at terminals 128,130 for connection with other electrical components for establishing a circuit for powering an electrical load.

The electrodes may take different shapes. The electrodes may be planar or curved, and may even be oriented to predominately face in planes that are orthogonal to one another. As such, the electrodes are not necessarily arranged in opposed facing relation to one another as may be found in a capacitor, although such arrangement is not precluded provided the electrodes experience the electric field strength differentials resulting in the voltage differentials for powering the electrical load. Thus, the shapes and orientations of the electrodes seen in FIG. 6 is merely for the purpose of a basic illustration and are not intended to be limitations on broad aspects of the invention.

Figure 7B:
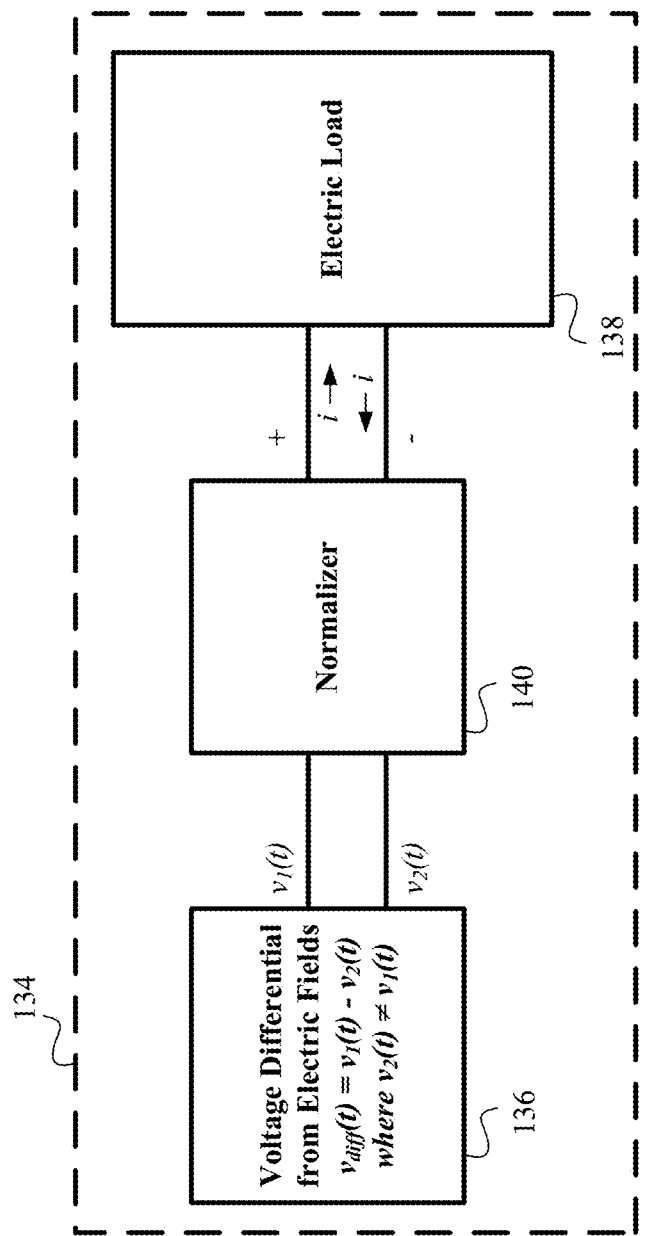
FIG. 7b illustrates a basic, schematic representation of an electric circuit including an EFA generator and a normalizer in accordance with one or more embodiments of the invention.

A basic, schematic representation of an electric circuit 134 including an EFA generator and a normalizer in accordance with one or more embodiments of the invention is illustrated in FIG. 7b. The electric circuit 134 comprises EFA generator 136 and electrical load 138. Additionally, as shown in FIG. 7b, the electric circuit 134 comprises a normalizer 140 for normalizing the voltage differential $v_1(t)-v_2(t)$ that varies as a function of time. The varying voltage differential represents the input for normalizer 140, and a voltage and current that is readily usable for powering the electrical load 138 is provided as the output for normalizer 140. Preferably, the output voltage is substantially constant or at least varies within a marginal range, which range is much less than the range of variation of the voltage differential from the EFA generator, and the output current preferably is direct current rather than alternating current. The normalizer may include one or more converters that include one or more of transformers, rectifiers, regulators, and filters. Indeed, is believed that the normalizer can be designed and constructed by the Ordinary Artisan for achieving desired voltage and current output.

It further will be appreciated that while the normalizer is shown as a component separate from the EFA generator and is representative of various embodiments of the invention, the normalizer may form part of the EFA generator which is representative of various other embodiments of the invention. Moreover, in scenarios in which the electrical load is compatible with the voltage differentials output by the EFA generator, or itself includes one or more components for normalizing voltage, the normalizer 140 illustrated in the electric circuit 134 may be omitted.

Figure 8:
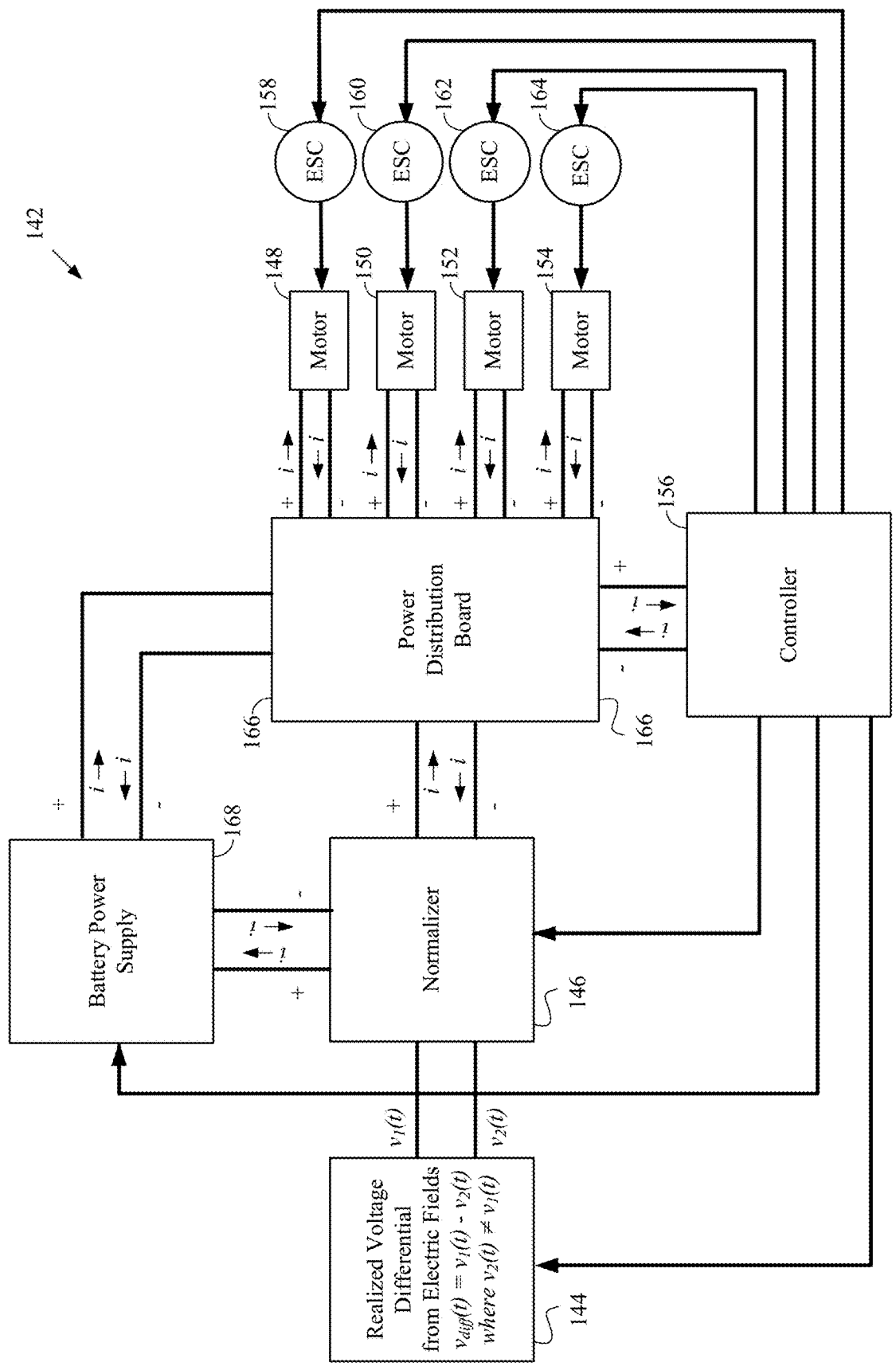
FIG. 8 illustrates a schematic representation of another representative electric circuit including an EFA generator and a normalizer, which electric circuit is intended for use, by way of example and not limitation, with a UAV in the form of a quadcopter.
Figure 9:
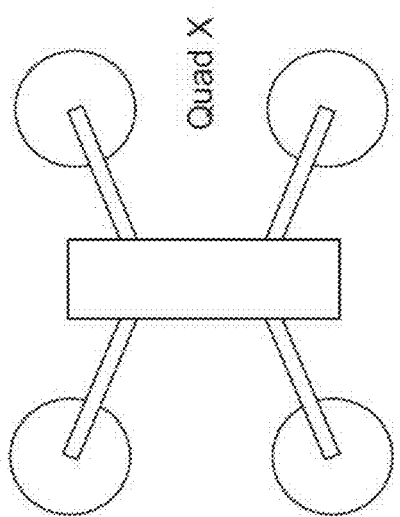
FIG. 9 illustrates a profile of a "Quad H" rotocopter.
Figure 10:
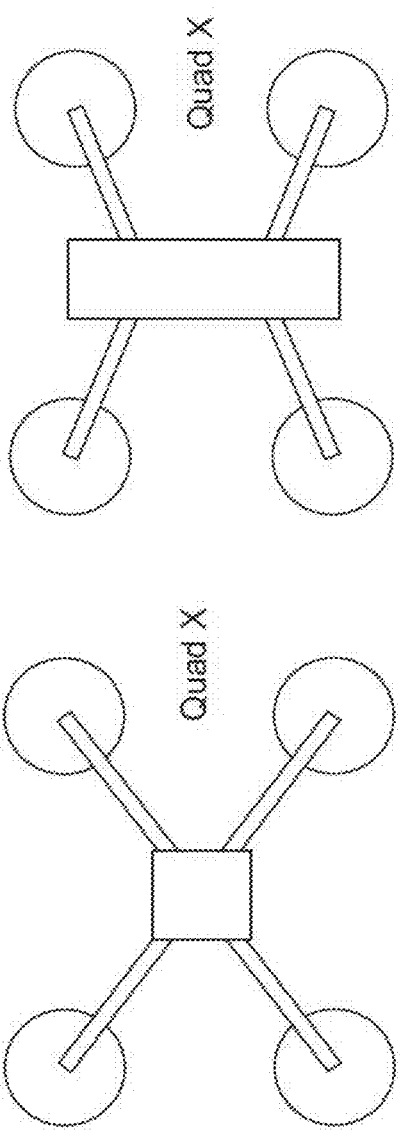
FIG. 10 illustrates a profile of a "Quad X" rotocopter.
Figure 11:
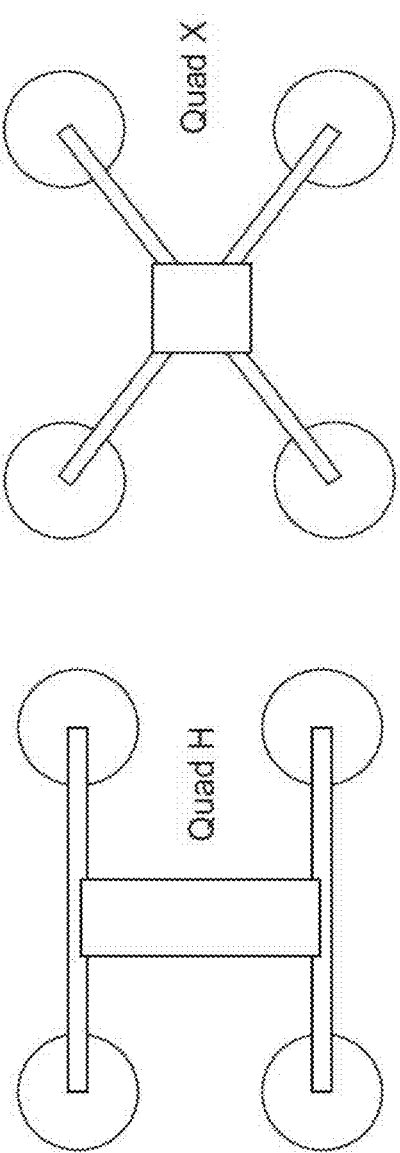
FIG. 11 illustrates an alternative profile of a "Quad X" rotocopter.
Figure 13:
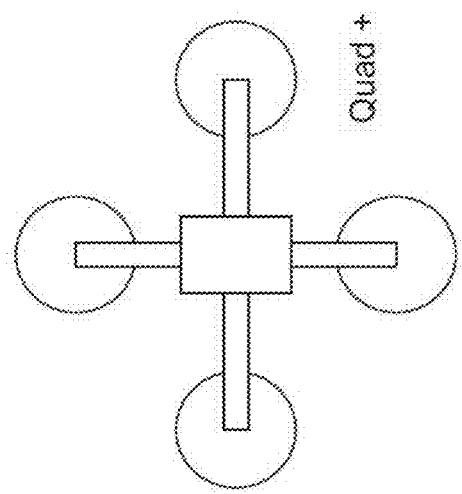
FIG. 13 illustrates a profile of a "Quad+" rotocopter.
Figure 12:
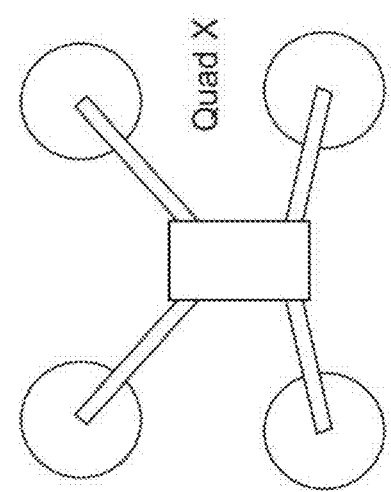
FIG. 12 illustrates another alternative profile of a "Quad X" rotocopter.

Another schematic representation of an electric circuit 142 including an EFA generator and a normalizer in accordance with one or more embodiments of the invention is illustrated in FIG. 8. This representative electric circuit 142 comprises EFA generator 144 and electrical load 146 and is intended for use with a UAV in the form of a quadcopter. Example profiles of such a quadcopter are illustrated in FIGS. 9-13 and, as seen therein, each quadcopter includes four rotors for providing lift and thrust. Each rotor is powered by a respective motor 148,150,152,154, the speed of which is controlled by an onboard computer or controller 156 via a respective electronic speed controller or ESC 158,160,162,164. The power to the controller is provided via a power distribution board 166, which also powers the motors and powers the ESC components (not shown for clarity).

In some embodiments, the electric circuit 142 also comprises a battery power supply 168 in addition to the EFA generator 144, which battery power supply 168 powers the power distribution board. In other embodiments, the battery power supply 168 is omitted and the electric circuit 142 is powered entirely by the EFA generator 144. When the batter power supply 168 is included, the one or more batteries thereof preferably are rechargeable, and the normalizer 146 preferably supplies power to the battery power supply 168 for charging of the one or more batteries.

The controller 156 preferably is connected to the batter power supply and to the normalizer 146 for controlling when the batteries are charged, and for controlling when power is supplied to the power distribution board by the batter power supply, and when power is supplied to the power distribution board from the EFA generator 144 via the normalizer 146. Power is supplied by the battery power supply preferably at least when the UAV is operated outside of the vicinity of powerlines or otherwise outside of the electric field strength differentials needed for the EFA generator to provide the required power to operate the UAV.

The controller 156 also preferably is connected to the EFA generator 144 for establishing electric circuits through switches as a function of both the voltage differentials experienced at the electrodes of the EFA generator 144 and the power requirements of the electrical load(s) of the electric circuit. The voltage differentials experienced at the electrodes of the EFA generator 144, which is a function of the various electric field strengths experienced at the electrodes, preferably is detected by way of voltage detectors within the EFA generator 144 that are operatively connected to the electrodes of the EFA generator 144 and in communication with the controller 156. Such electric circuit switching within an EFA generator for optimizing the current and voltage output characteristics for the electrical load requirements is further disclosed and discussed hereinbelow.

FIGS. 14-29 further relate to embodiments of quadcopters that are exemplary of one or more aspects and one or more features of embodiments of the invention and are described in detail below.

Figure 14:
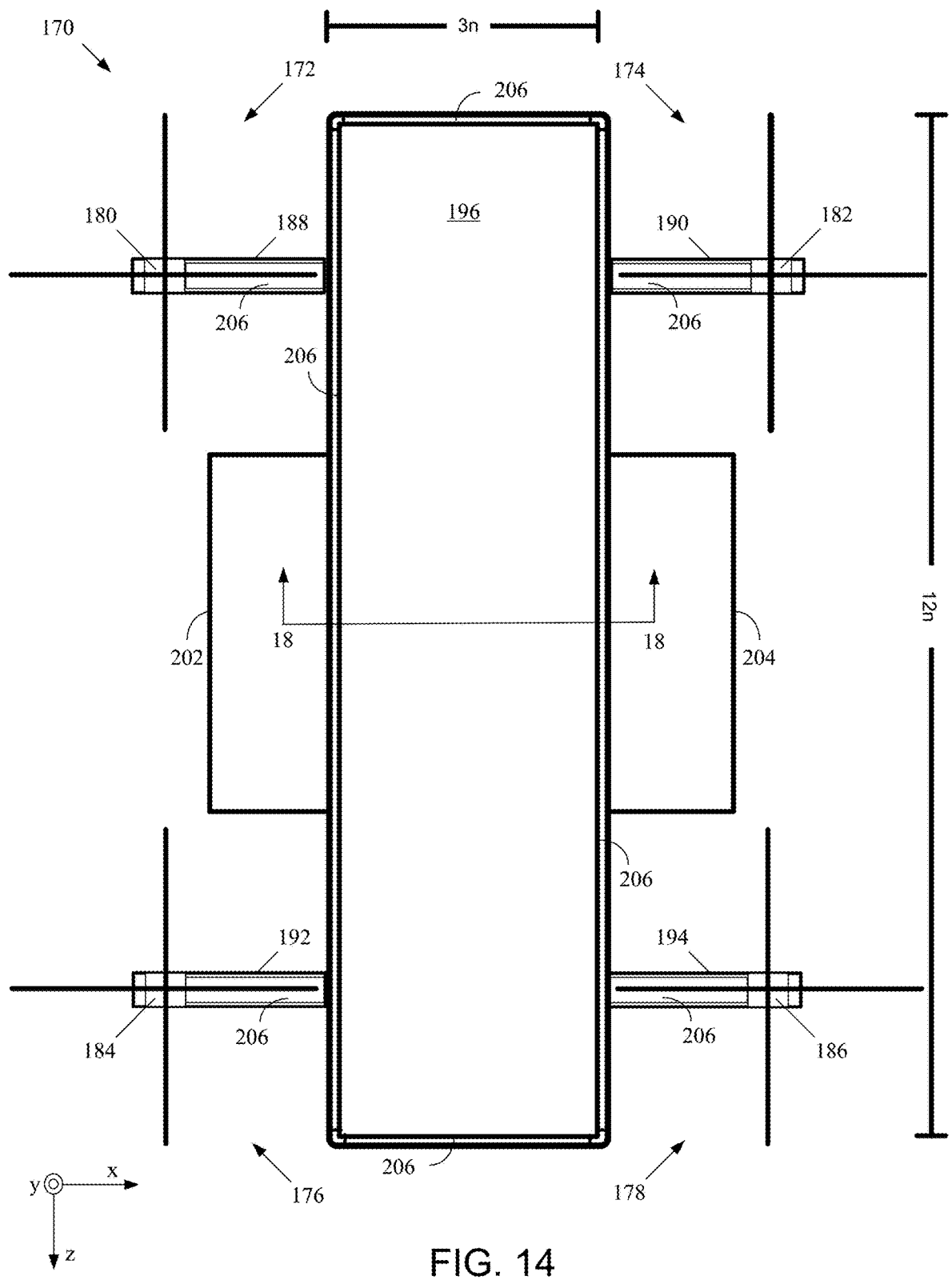
FIG. 14 is a top schematic view of a first exemplary quadcopter 170 in accordance with an embodiment of one or more aspects and features of the invention.
Figure 22:
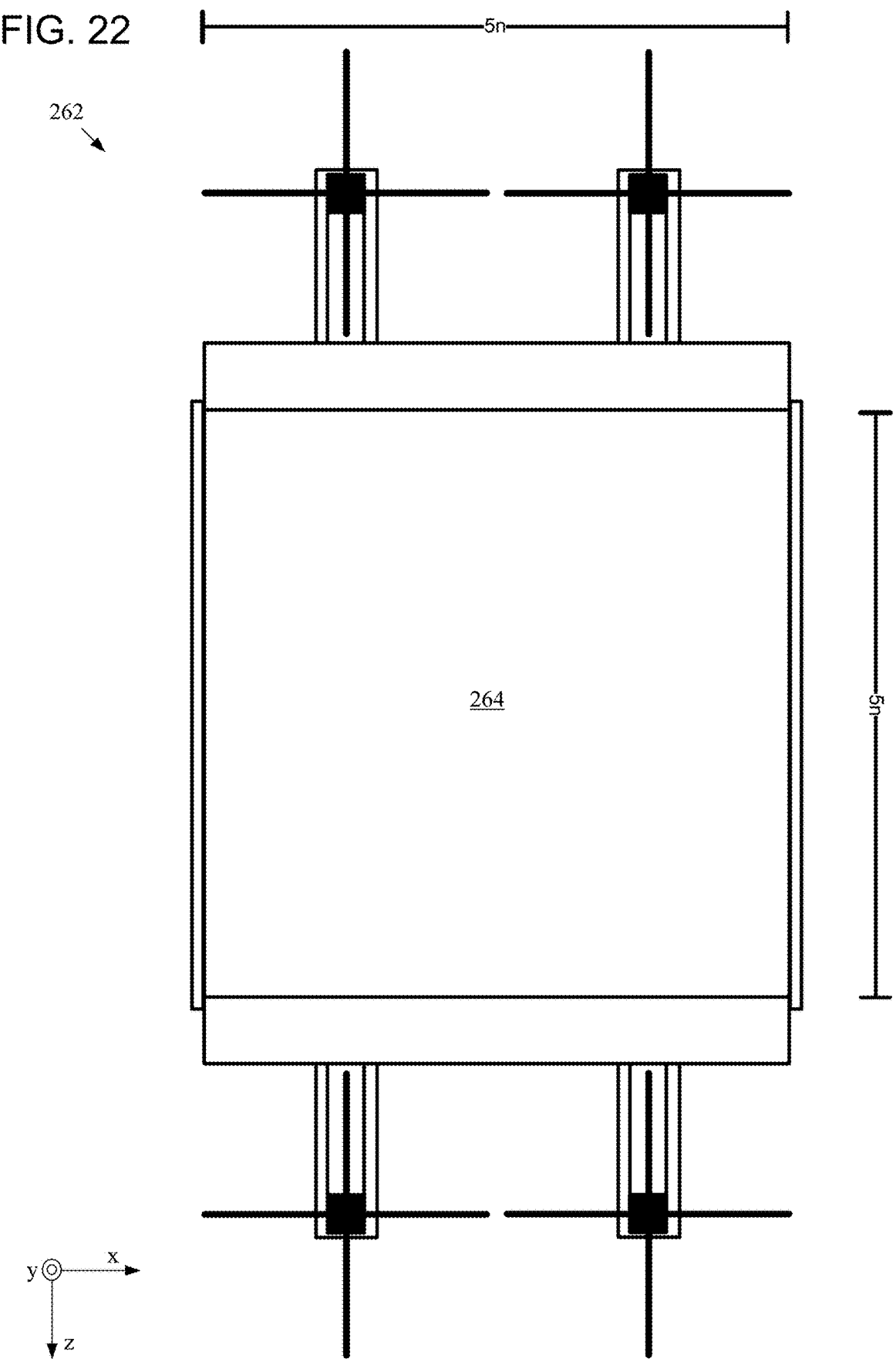
FIG. 22 is a top schematic view of a third exemplary quadcopter 262 in accordance with an embodiment of one or more aspects and features of the invention.
Figure 25:
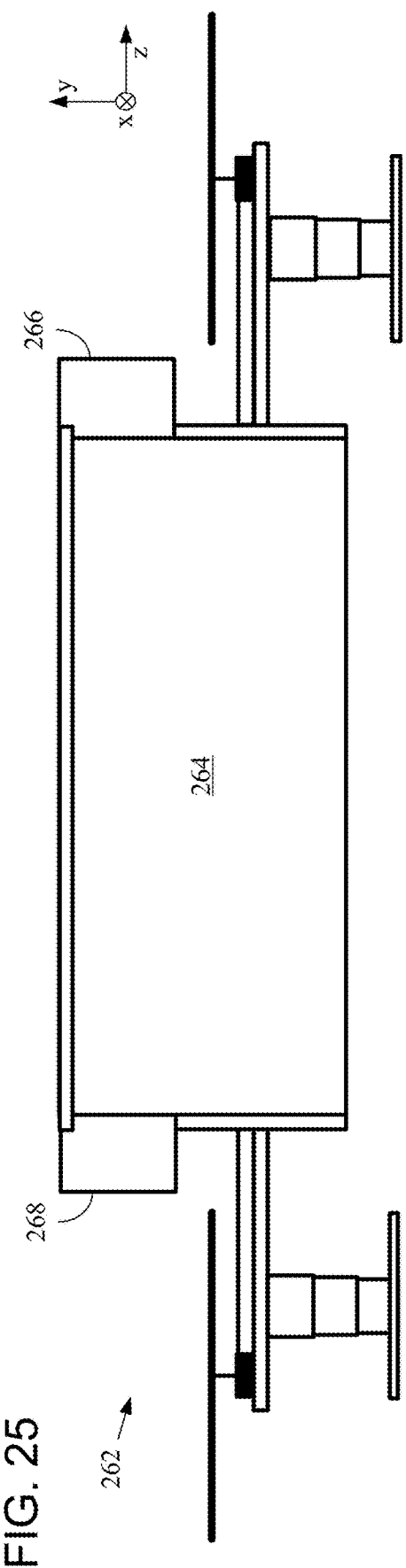
FIG. 25 is a second side schematic view of the quadcopter 262 in the landed configuration, which side is opposite to the side of FIG. 23.
Figure 26:
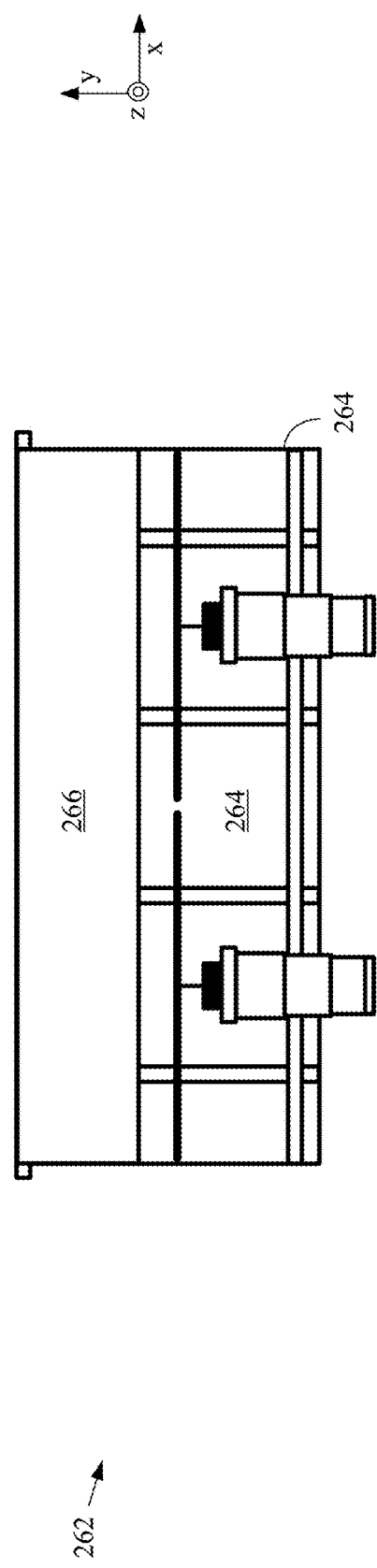
FIG. 26 is a front schematic view of the quadcopter 262 in the landed configuration.
Figure 27:
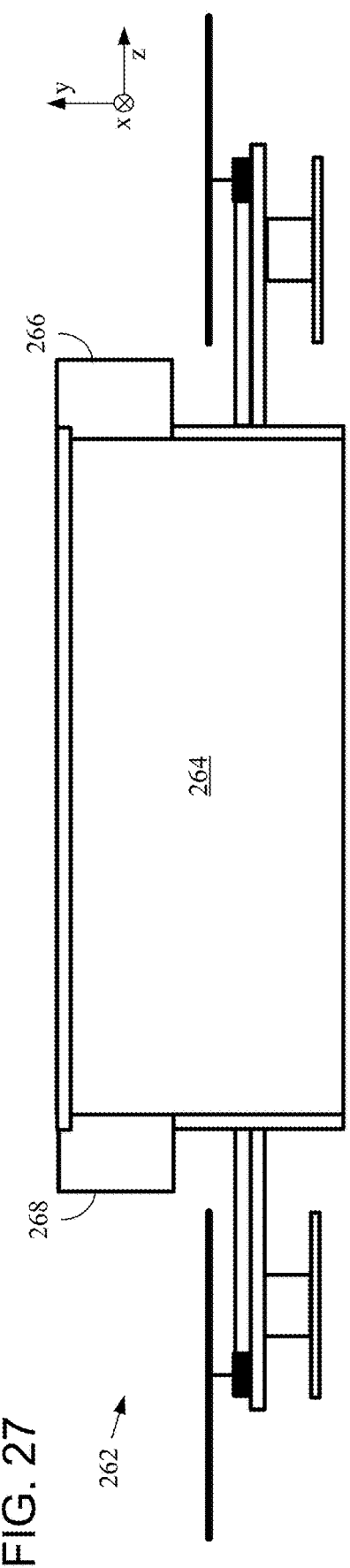
FIG. 27 is the second side schematic view of the quadcopter 262, wherein the quadcopter is in a flight configuration.
Figure 28:
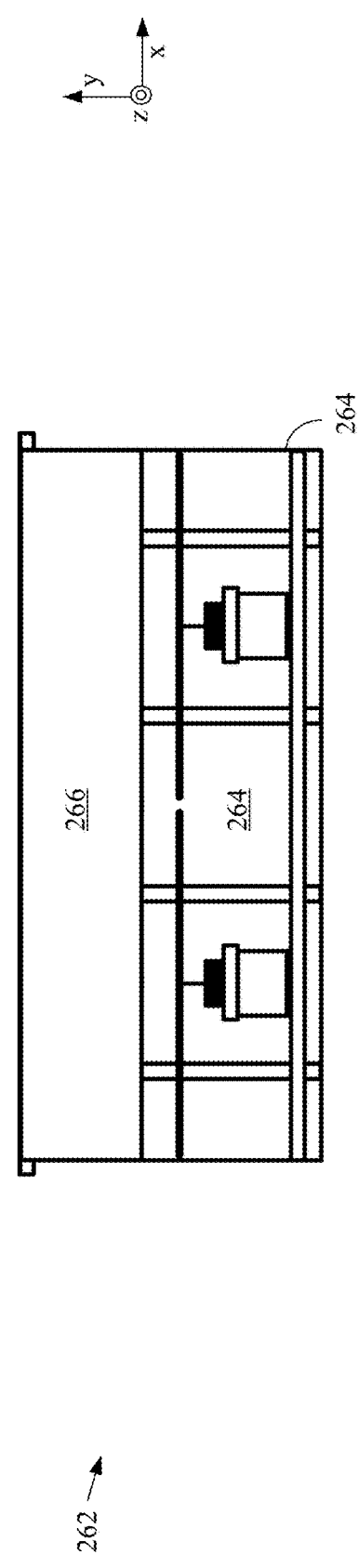
FIG. 28 is a front schematic view of the quadcopter 262 in the flight configuration.

With specific regard to FIGS. 14-18, a first exemplary quadcopter 170 is now described. In this respect, FIG. 14 is a top schematic view of the quadcopter 170; FIG. 15 is a first side schematic view of the quadcopter 170 of FIG. 14; FIG. 16 is a second side schematic view of the quadcopter 170 of FIG. 14, which side is opposite to the side of FIG. 15; FIG. 17 is an exploded view of the quadcopter 170 seen in FIG. 16. Additionally, FIG. 18 is a cross-sectional view of the EFA generator taken along lines 18-18 of FIG. 14.

As seen in FIGS. 14-17, the quadcopter 170 comprises four rotors 172,174,176,178 driven by motors 180,182,184, 186. Each rotor and motor are supported by a respective arm 188,190,192,194 that extends from and is connected to an enclosure of the quadcopter 170. The enclosure comprises a rectangular block-shaped main housing 196 that is preferably made from a non-conducting plastic material. An EFA generator 200 is encased within the housing 196 and is seen through a partial wall cutout in FIG. 16 as well as in the exploded view of FIG. 17.

The quadcopter 170 further comprises a forward secondary housing 202 and a rear secondary housing 204, each located on the exterior of the housing 196 and each located between pairs of the rotors. A series of conduits 206 extend along the exterior of the housing 196 and along the arms 188,190,192,194 and define electrical pathways. Preferably, wiring extends through interior channels of conduits 206. Referring to the exemplary circuit illustrated in FIG. 8 in the context of the quadcopter 170, the EFA generator—and specifically the group of electrodes thereof—is contained within the housing 196 while the other electric components including the normalizer, power distribution board, battery power supply (if included), and controller are collectively contained within one or more of the secondary housings 202,204. The motors are located on the arms, and the electronic speed controllers are located on the arms with the motors or are contained within the one or more of the secondary housings 202,204. The pathways of the conduits 206 electrically interconnect these components in forming the electric circuit 142.

The quadcopter 170 further comprises a plurality of telescoping legs, one pair 208,210 which is seen in FIG. 15 and another pair 212,214 which is seen in each of FIGS. 16 and 17. The legs extend downwardly for landing of the quadcopter, which position is seen in FIG. 16, and retract upwardly for flight, which position is seen in FIG. 15. When retracted, the feet of the legs 208,210,212,214 are located above an elevation of the bottom of the housing 196 (see, e.g., FIG. 15). Extension and retraction of the legs preferably is handled by the controller of the UAV.

The cross-sectional view of the EFA generator 200 taken along lines 18-18 of FIG. 14 is seen in FIG. 18. This cross-sectional view shows that the EFA generator 200 comprises a first electrode 216 and a second electrode 218, with an insulator 220 extending between the two electrodes 216,218. Each electrode 216,218 in the quadcopter 170 preferably is thin and wide and comprises a conducting material. Indeed, each electrode more preferably is a metallic plate.

The insulator 220 preferably is lightweight and able to withstand a large voltage differential between the electrodes 216,218 before breaking down. Possible materials of which the insulator 220 comprises include clay; ceramic; porcelain; PVC; cresyl pthalate; DEHP; plastics; rubber; nylon; glass; dry air; fiberglass; polyurethane foam; polystyrene (Styrofoam); paper; and Teflon. The insulator 220 may be in the form of an elongate member having an oval or polygonal profile in cross-section. It will be appreciated by the Ordinary Artisan that the insulator 220 illustrated in FIG. 18 may be seen as a dielectric extending between the electrodes 216,218.

Additionally, an insulator may comprise a gas or combination of gases, such as air, in which case the insulator 220 of FIG. 18 is replaced with a containment space 221 between the electrodes containing such gas or combination of gases, which is represented in FIG. 18a. In at least some preferred embodiments, the insulator is hydrogen gas, and the interior of the EFA generator comprises an airtight containment space between opposing electrodes in which the hydrogen is retained. Use of hydrogen gas is beneficial insofar as the hydrogen gas—in additional to being an insulator—will provide a degree of lift, thereby reducing the weight of the EFA generator. This buoyancy-assisted lift provided by the hydrogen gas will lessen the power requirements for operating the UAV. The hydrogen gas may be non-pressurized. The hydrogen gas also may be pressurized in some embodiments, thereby buttressing the structural integrity of the walls of the containment space of the EFA generator. It further is contemplated that, in at least some preferred embodiments, helium gas is utilized instead of hydrogen gas and that, in some embodiments, the helium is pressurized for buttressing the structural integrity of the walls of the containment space 221 of the EFA generator. In still some further embodiments, it is contemplated that a vacuum is created and maintained—and no gas is provided—within the containment space 221. In other preferred embodiments, the gas—whether helium or hydrogen—is heated. Such heating may be accomplished through spark gaps or resistive heaters utilizing voltage differentials and current flow between electrodes. Of course, no oxygen is introduced when hydrogen is utilized so as to eliminate risks of potential explosions or fires. When such heating is employed, many gasses both including and other than hydrogen and helium may be used.

While aspects of the invention in their broadest definitions are not intended to be limited by any particular dimensional characteristic of the UAV, certain aspects and features do relate to dimensions of the UAV. In this respect, it is believed that it may be preferred in the context of UAVs operating in vicinity of at least certain powerline arrangements to have an elongate dimension in the direction of travel versus the crosswise and vertical dimensions.

In this respect, and as used herein, the direction of travel is referred to as the "z" direction, axis, or component and is intended to be in a direction in which powerlines extend between consecutive supporting towers. The "x" direction, axis, or component is in a direction orthogonal to the z direction and represents a distance from a centerline of the powerline arrangement. In a hypothetical where towers are situated at the same elevation and the powerlines are in perfect linear extent between such towers, the x direction corresponds to a horizontal direction orthogonal to the direction of the Earth's gravity. The "y" direction, axis, or component is in a direction orthogonal to both the z direction and x direction, and in the stated hypothetical, the y direction corresponds to the vertical direction (parallel to force lines representing the Earth's gravity).

With this in mind, it will be appreciated that the quadcopter 170 seen in FIGS. 14 and 15 has an elongate dimension in the z direction and, specifically, the quadcopter 170 is seen to have a main body 196 with a length in the z direction of 12 units, a width in the x direction of 3 units, and a height in the y direction of one unit, wherein the unit is represented by "n" and could be any desired length within reason for operation of the UAV within the vicinity of the powerlines of a power transmission system. For example, "n" in one or more preferred embodiments is between approximately one foot or approximately a third of a meter.

The EFA generator 200 preferably consumes the entire volume of the main housing 196 of the quadcopter 170. In this respect, the electrodes 216,218 preferably extend commensurate with the top and bottom surfaces of the main housing 196. In other embodiments, the EFA generator 200 may not consume the entirety of the volume of the main housing 196, in which case one or more electrical components may be included within the housing 196 rather than in secondary housings or in other areas of the UAV. Moreover, in cases where the UAV transports cargo, the cargo may be contained within the main housing 196 rather than, or in addition to, being contained within one or more secondary housings, space permitting.

Additionally, the EFA generator 200 preferably represents a self-contained power supply unit that is removably received within a containment space of the main housing 196, which is illustrated in the exploded view of FIG. 17. The EFA generator 200 preferably comprises at least a pair of terminals 222,224, and optionally additional terminals such as the pair of terminals 226,228, for electrically connecting the EFA generator 200 with other electrical components of the quadcopter 170 through the wiring in the conduits 206. Electrical pathways connect the electrodes and terminals. Thus, for example, electrical pathways 223,227 each in the form of a conducting wire respectively connect the first electrode 216 with terminal 222 and terminal 226; and electrical pathways 225,229 each in the form of a conducting wire respectively connect the second electrode 218 with terminal 224 and terminal 228.

The EFA generator 200 in the form of a power supply unit preferably is removable and replaceable with each of other different EFA-generator power supply units having compatible dimensions and configurations. Because the EFA generator in the form of a power supply unit is a self-contained unit with connecting terminals, the quadcopter 170 can be outfitted with different power supply units depending on the different possible powerline arrangements the vicinity of which the quadcopter 170 is intended to be operated, and on the one or more components or devices to be powered thereby. As further disclosed below, the different but compatible EFA-generator power supply units may differ, for example, in the material of the electrodes, the shape of the electrodes, the area of the electrodes, the number of the electrodes, the number of different circuits that can be formed with the electrodes, and the insulator between electrodes. Such differences are believed to alter the power characteristics, including voltage and current, that is provided, as well as the ability or efficiency in providing such power.

FIGS. 19-21 illustrate a second exemplary quadcopter 230 representing a variation of quadcopter 170, and the disclosure of the quadcopter 170 applies to quadcopter 230 with the following exceptions.

As illustrated, quadcopter 230 comprises at least one camera, and preferably two or more cameras 232,234, which are shown as located on the secondary housings 236,238. Cameras alternatively or additionally may be located on a top of the UAV; on a bottom of the UAV; on one or both ends of the UAV; and on the front or rear of the UAV. The cameras 232,234 are configured for taking digital photographs, for recording video, and/or recording audio and video. Electrical components supporting the cameras 232,234, including one or more processors and memory, preferably are included within one or more of the secondary housings, but may be included within the central housing 240 or even within one or more of the conduits (several of which conduits 242,244, 246 are seen in FIG. 21) or on one or more of the arms (two of which arms 248,250 also are seen in FIG. 21).

Additionally, quadcopter 230 comprises a base 252 to which the arms are connected and from which the arms extend, with the housing being supported on top of the base 252. A plurality of hydraulic extension legs (two of which legs 254,256 are seen in FIG. 19 and two of which legs 258,260 are seen in FIG. 21) are connected to the bottom of the base 252 and are transitionable between retracted positions (seen in FIG. 20) and extended positions (seen in FIGS. 19 and 21). Extension and retraction of the legs preferably is handled by the controller of the UAV.

Lastly, the EFA generator of the quadcopter is integrated into the housing 240 and is not a separate, removable unit from the housing 240, which differs from the quadcopter 170. It will be appreciated, however, that at least in the quadcopter 240 and embodiments of the invention represented thereby, the housing 240 may be detached from the base 252 and a compatible housing with an EFA generator having the same or different power characteristics may be attached to the base 252, which is similar to changing out the EFA generator when in the form of a removable power supply unit.

FIGS. 22-29 illustrate a third exemplary quadcopter 262 similar to quadcopter 170, and the disclosure of the quadcopter 170 applies to quadcopter 262 with the following variations. First, from review of the drawings it should be apparent that the main housing 264 is rectangular in shape with respect to the x and z axes, the dimension in each direction of which is "5n". The height in the y direction is "2.3n", wherein "n" can be any desired length within reason for operation of the UAV within the vicinity of the powerlines of a power transmission system. For example, "n" in one or more preferred embodiments is between approximately one foot or approximately a third of a meter.

In another variation, the quadcopter 262 includes secondary housings 266,268 that extend an entire length of the main housing 264 in one of the x and z directions. Thus, as seen for example in FIG. 24, secondary housing 268 extends from one side of the quadcopter 262 to the other side of the quadcopter 262 in the x direction and is located at an elevation above the rotors of the quadcopter 262; and as seen for example in FIG. 26, secondary housing 266 similarly extends from one side of the quadcopter 262 to the other side of the quadcopter 262 in the x direction and is located at an elevation above the rotors of the quadcopter 262.

It further will be appreciated that each of FIGS. 23-26 illustrates the quadcopter 262 in a configuration with the telescoping legs extended for landing. In contrast, FIGS. 27-28 each illustrates the quadcopter 262 in a configuration with the telescoping legs retracted for flight.

Figure 29:
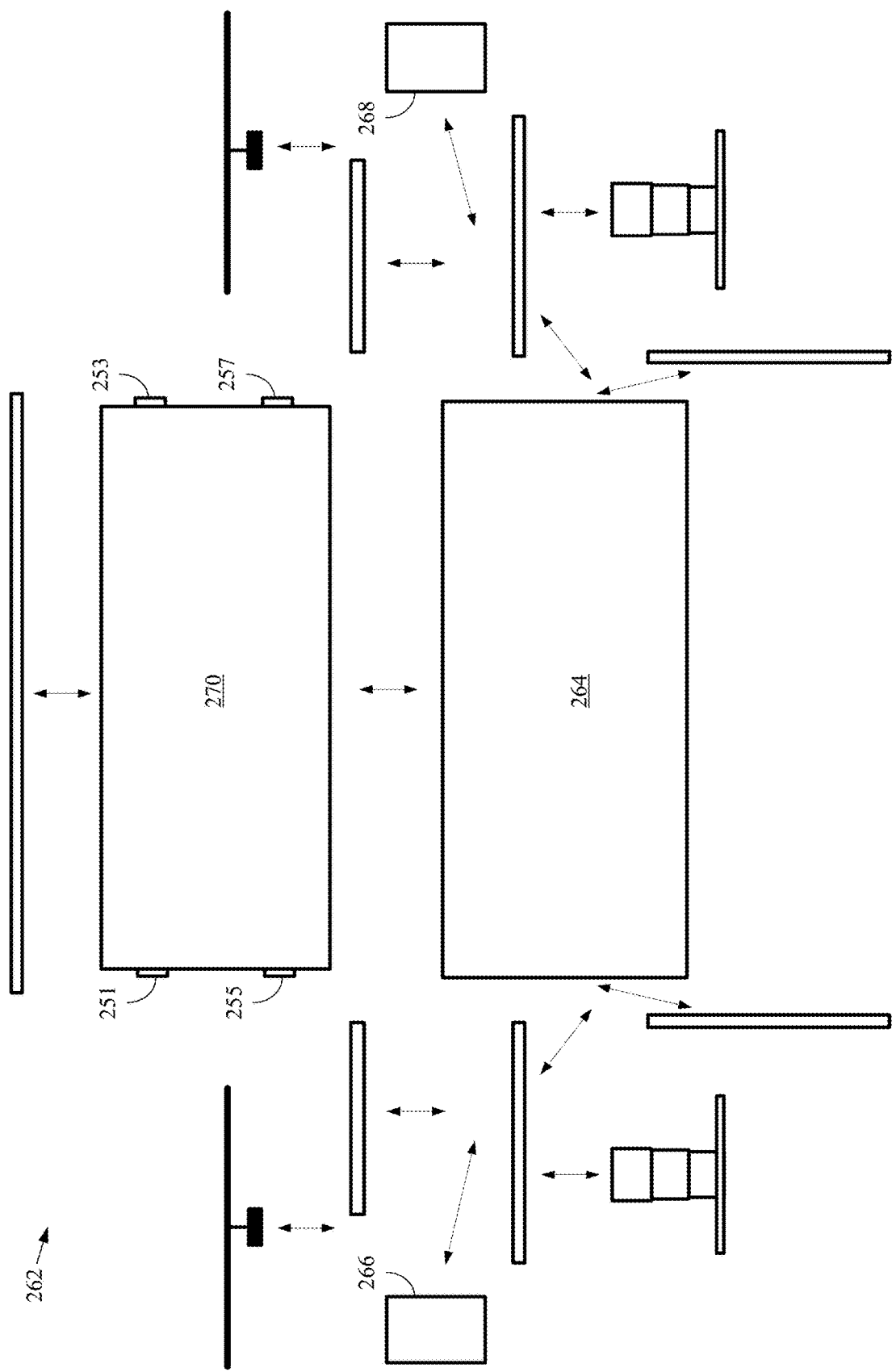
FIG. 29 is an exploded view of the quadcopter 262 seen in FIG. 25.

Similar to the quadcopter 170, quadcopter 262 also includes an EFA generator in the form of a removable power supply unit 270, perhaps as best seen in the exploded view of FIG. 29. The EFA-generator power supply unit 270 preferably comprises at least a pair of terminals 251,253 and optionally additional terminals such as the pair of terminals 255,257 for electrically connecting the EFA generator with wiring of the conduits.

Figure 30:
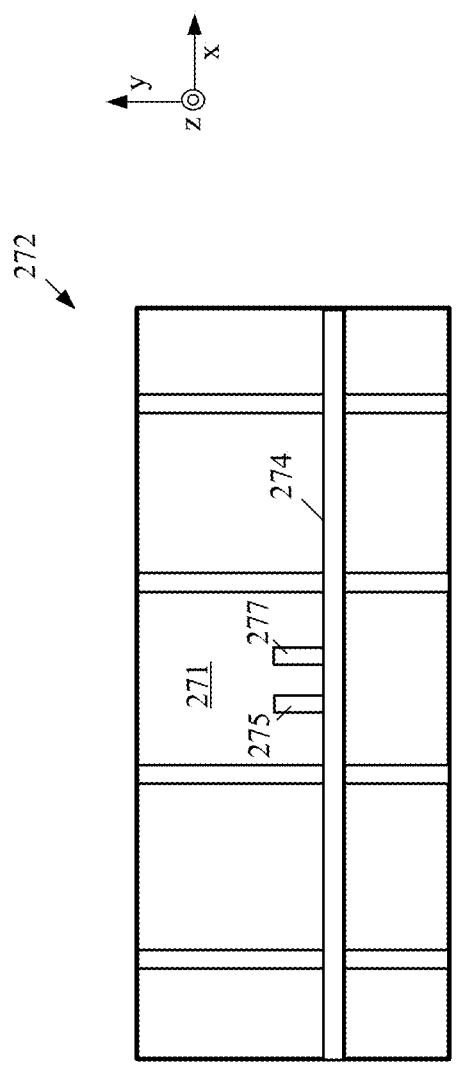
FIG. 30 is a front schematic view of a main housing of a UAV together with conduits in accordance with one or more embodiments of the invention.
Figure 31:
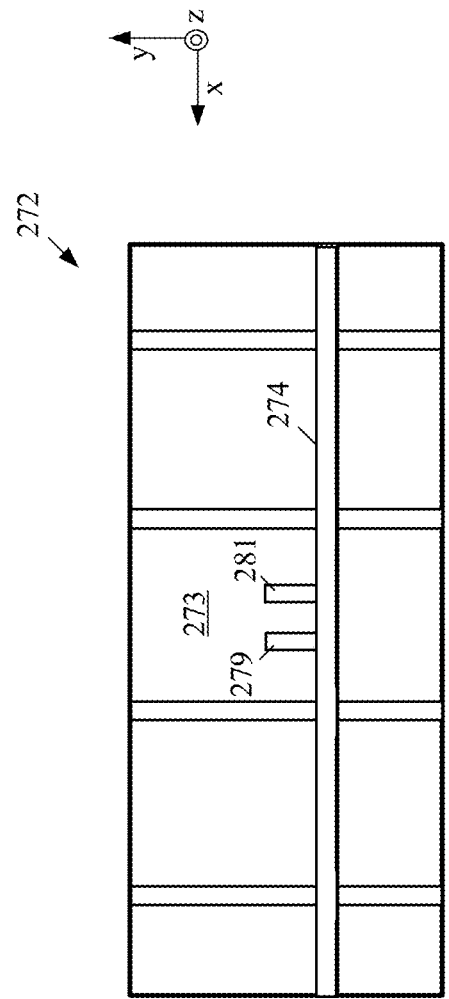
FIG. 31 is a rear schematic view of the main housing and conduits.

FIG. 30 is a front schematic view of a main housing 272 that is representative of one or more embodiments of UAVs in accordance with one or more aspects and features of the invention. FIG. 31 is a rear schematic view of the main housing 272 and conduits 274. Wires preferably extend within the conduits 274 representing electrical pathways for connecting electrical components of the UAV with an EFA generator contained within the main housing 272. With respect to this representative example, the EFA generator preferably is integrated with the housing and is not in the form of a removable power supply unit. Of course, in other embodiments of UAVs in accordance with one or more aspects and features of the invention, the EFA generator is in the form of a removable power supply unit.

Figure 32:
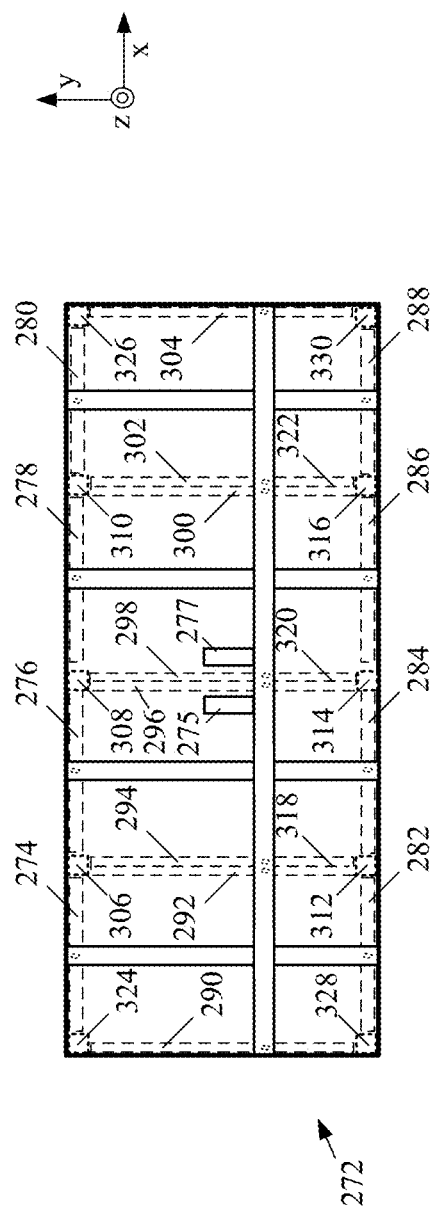
FIG. 32 is another view of that of FIG. 30, wherein both electrodes contained within the main housing and openings between the electrodes and the interior of the conduits are seen in phantom.

Furthermore, no secondary housing is shown for clarity, but one or more secondary housings may be included with the main housing 272 in an embodiment. The electrical components of the UAV connected by the conduits 274 preferably are contained in one or more such secondary housings and are connected therewith through one or more terminals of the EFA generator. One or more front terminals conduits 275,277 of the main housing 272 provide electrical pathways to the terminals of the EFA generator and are schematically illustrated in FIGS. 30 and 32; back terminal conduits 279,281 of the main housing 272 provide electrical pathways to the terminals of the EFA generator, too, and are schematically illustrated in FIG. 31. The electrical pathways of the terminal conduits enable electrical connections with and powering of electrical components that may be located within a secondary housing located at a front or back of the housing. In at least some embodiments, such electrical components also may be contained within the conduits themselves and may be contained on one or more integrated circuit boards. Moreover, any such secondary housing and any or all of the conduits may be insulated to shield the electrical components contained therein and the wiring from the electric fields that are encountered within the vicinity of powerlines. Of course, the main housing containing the EFA generator does not shield the EFA generator from such electric fields.

FIG. 32 is another view of that of FIG. 30, wherein electrodes contained within the main housing 272 are seen in phantom. The EFA generator illustrated in FIG. 32 includes sixteen electrodes comprising upper electrodes 274,276,278,280 each parallel to one another and substantially extending in a common plane; lower electrodes 282, 284,286,288 each parallel to one another and substantially extending in a common plane, and each substantially parallel to each of the upper electrodes 274,276,278,280; side electrodes 290,304; and intermediate electrodes 292,294, 296,298,300,302 spaced apart from one another, each intermediate electrode being oriented in parallel relation to and located between the side electrodes 290,304. The sixteen electrodes are electrically insulated from each other such that a differential in voltage between electrodes is enabled that results from differentials in electric field strength experienced at the electrodes when within the vicinity of the powerlines.

In this regard, insulators 306,308,310 form barriers between the upper electrodes 274,276,278,280; insulators 312,314,316 form barriers between the lower electrodes 282,284,286,288; insulators 318,320,322 form barriers between pairs of the intermediate electrodes 292,294, 296, 298, and 300,302; insulator 324 forms a barrier between the upper electrode 274 and the side electrode 290; insulator 326 forms a barrier between the upper electrode 280 and the side electrode 304; insulator 328 forms a barrier between the lower electrode 282 and the side electrode 290; and insulator 330 forms a barrier between the lower electrode 288 and the side electrode 304. These insulating barriers prevent electrical shorting between electrodes having differing voltages and enable voltage differentials for establishing circuits for driving electrical loads in accordance with one or more aspects and features of the invention. Furthermore, insulators 306,308,310,312,314,316,324,326,328,330 each preferably is in the form of an elongate members having an oval or polygonal cross-sectional profile; and insulators 318,320, 322 preferably are in a planar form and may comprise one or more sheets or films and may include composite materials.

Figure 33:
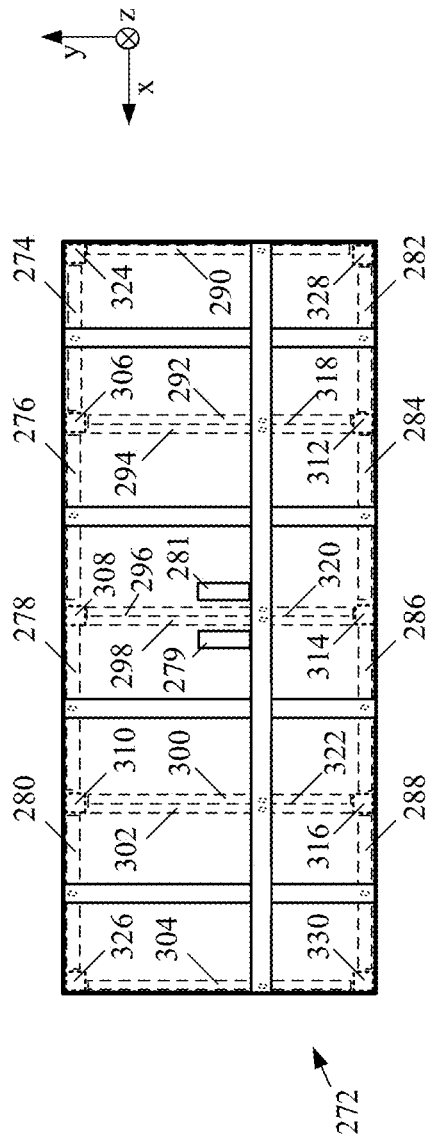
FIG. 33 is another view of that of FIG. 31, wherein both electrodes contained within the main housing and openings between the electrodes and the interior of the conduits are seen in phantom.
Figure 34:
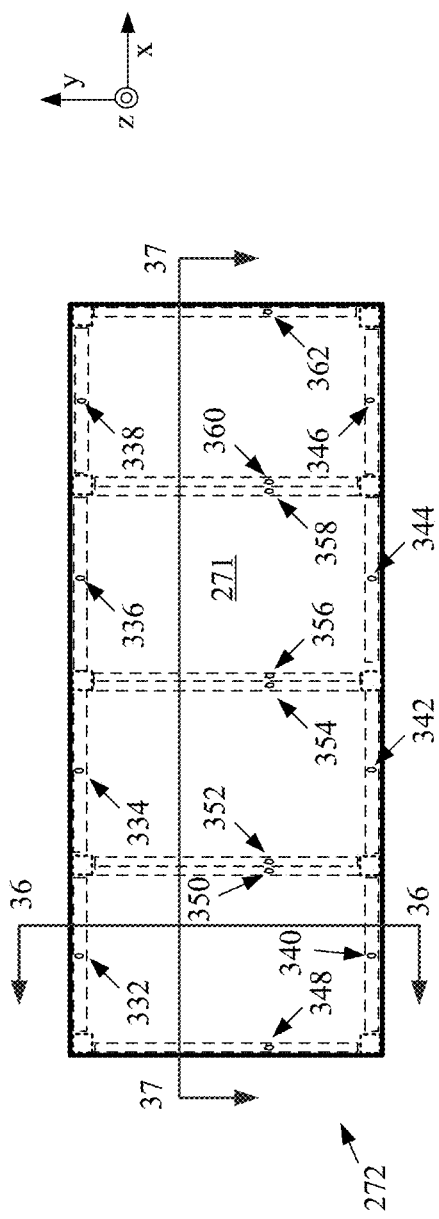
FIG. 34 is another view of that of FIG. 32, but wherein the conduits are omitted.
Figure 35:
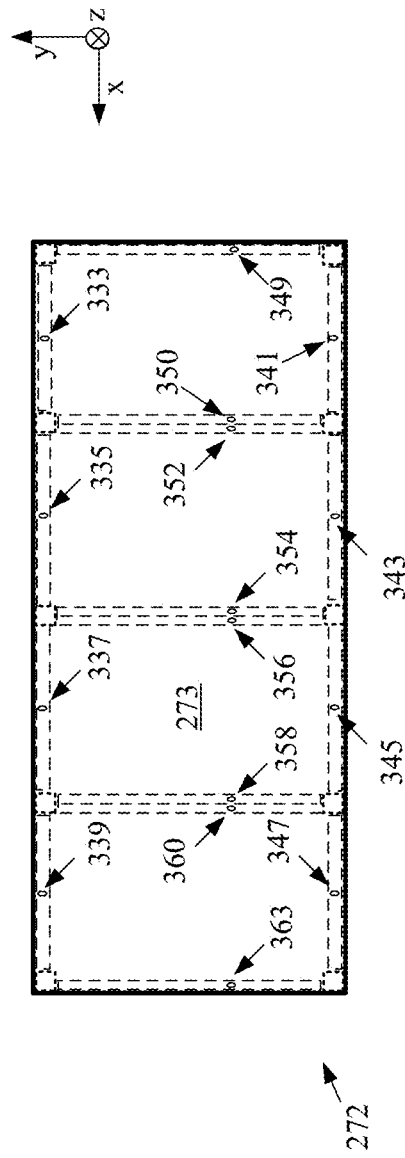
FIG. 35 is another view of that of FIG. 33, but wherein the conduits are omitted.

Sixteen access openings are provided in the front exterior wall 271 of the main housing 272 through which wires of the conduits 274 extend for electrical connection with the sixteen electrodes contained within the main housing 272. Sixteen access openings also preferably are provided in the back exterior wall 273 of the main housing 272 through which wires of the conduits 274 also may extend for electrical connection with the sixteen electrodes contained within the main housing 272. These access openings are illustrated in phantom in FIGS. 32 and 33. These access openings also are seen in FIGS. 34 and 35, in which figures the conduits 274 have been omitted for view of such openings.

The sixteen access openings in the front exterior wall 271 comprise openings 332,334,336,338 for access to the upper electrodes 274,276,278,280; openings 340,342,344,346 for access to the lower electrodes 282,284,286,288; and openings 348,362 for access to the side electrodes 290,304.

The sixteen access openings in the back exterior wall 273 comprise openings 333,335,337,339 for access to the upper electrodes 274,276,278,280; openings 341,343,345,347 for access to the lower electrodes 282,284,286,288; and openings 349,363 for access to the side electrodes 290,304.

Figure 36:
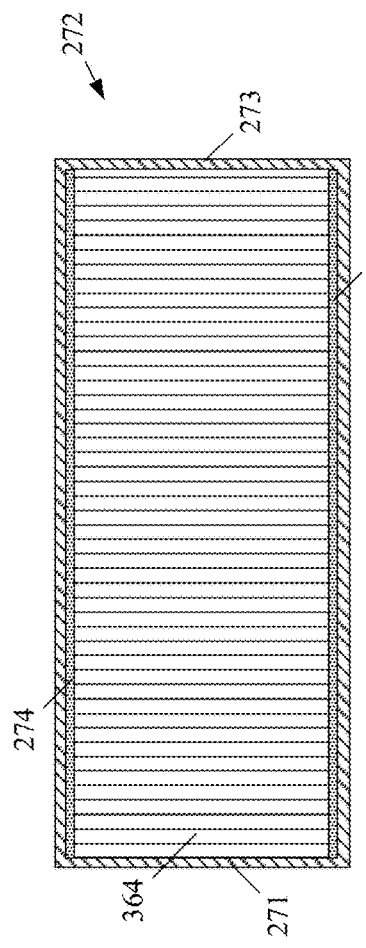
FIG. 36 is a cross-sectional view of the interior of the main housing taken along lines 36-36 in FIG. 34.

A cross-sectional view of the main housing 272 along lines 36-36 is seen in FIG. 36. An insulating material 364 is seen contained within the main housing 272, which insulating material extends between the upper electrode 274 and the lower electrode 282. The insulating material 364 preferably comprises a dielectric material in at least some embodiments.

Figure 37:
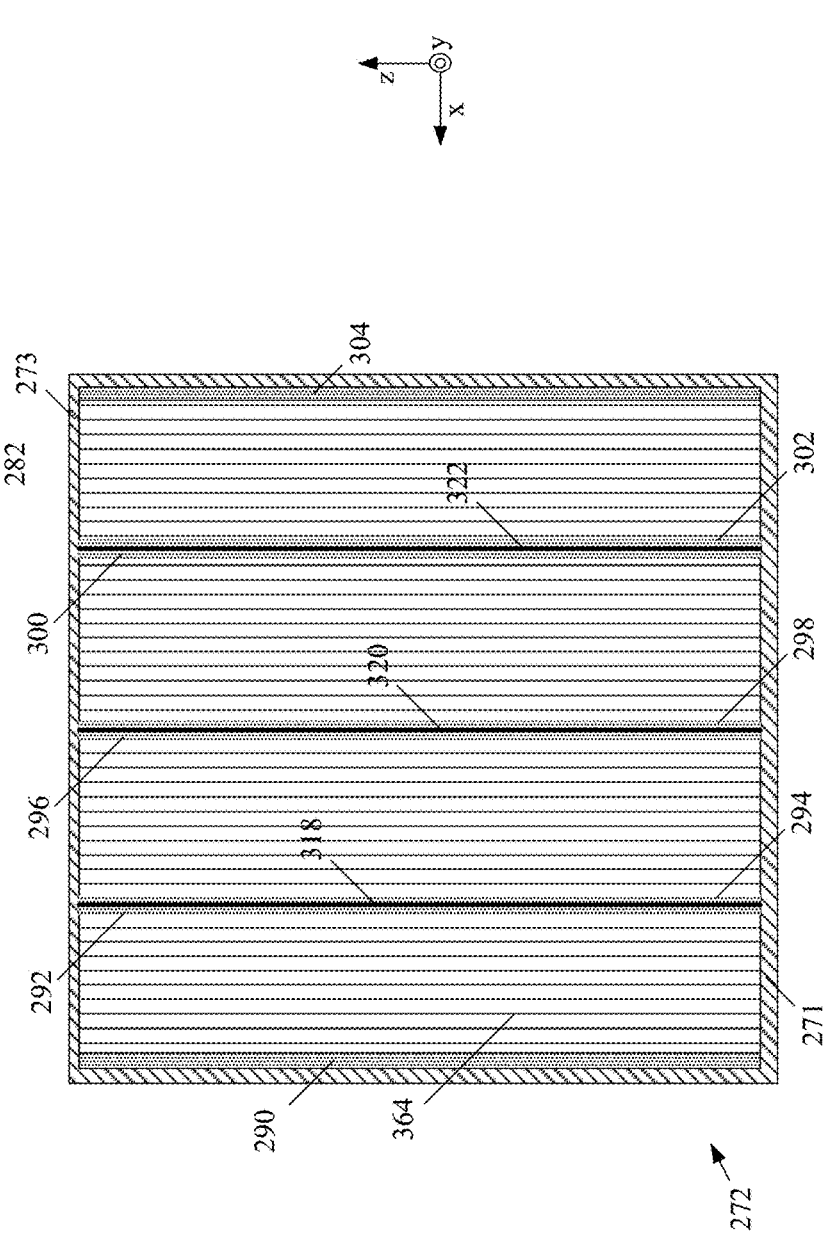
FIG. 37 is a cross-sectional view of the interior of the main housing taken along lines 37-37 in FIG. 34.

Another cross-sectional view of the main housing 272 along lines 37-37 is seen in FIG. 37. In this view, side electrodes 290,304 are seen to be positioned at opposite ends of the sequence of spaced apart electrode pairs 292,294; 296,298; and 300,302, each electrode of each pair being arranged in parallel with the side electrodes 290,304. Furthermore, as seen in FIG. 37, the insulating material 364 preferably comprising a dielectric material extends between electrodes 290,292; 294,296; 298,300; and 302,304. Additionally, the insulators 318,320,322 forming the electrical barriers between the intermediate electrodes 292,294; 296, 298; and 300,302 are seen in FIG. 37.

Figures 36A, 37A:
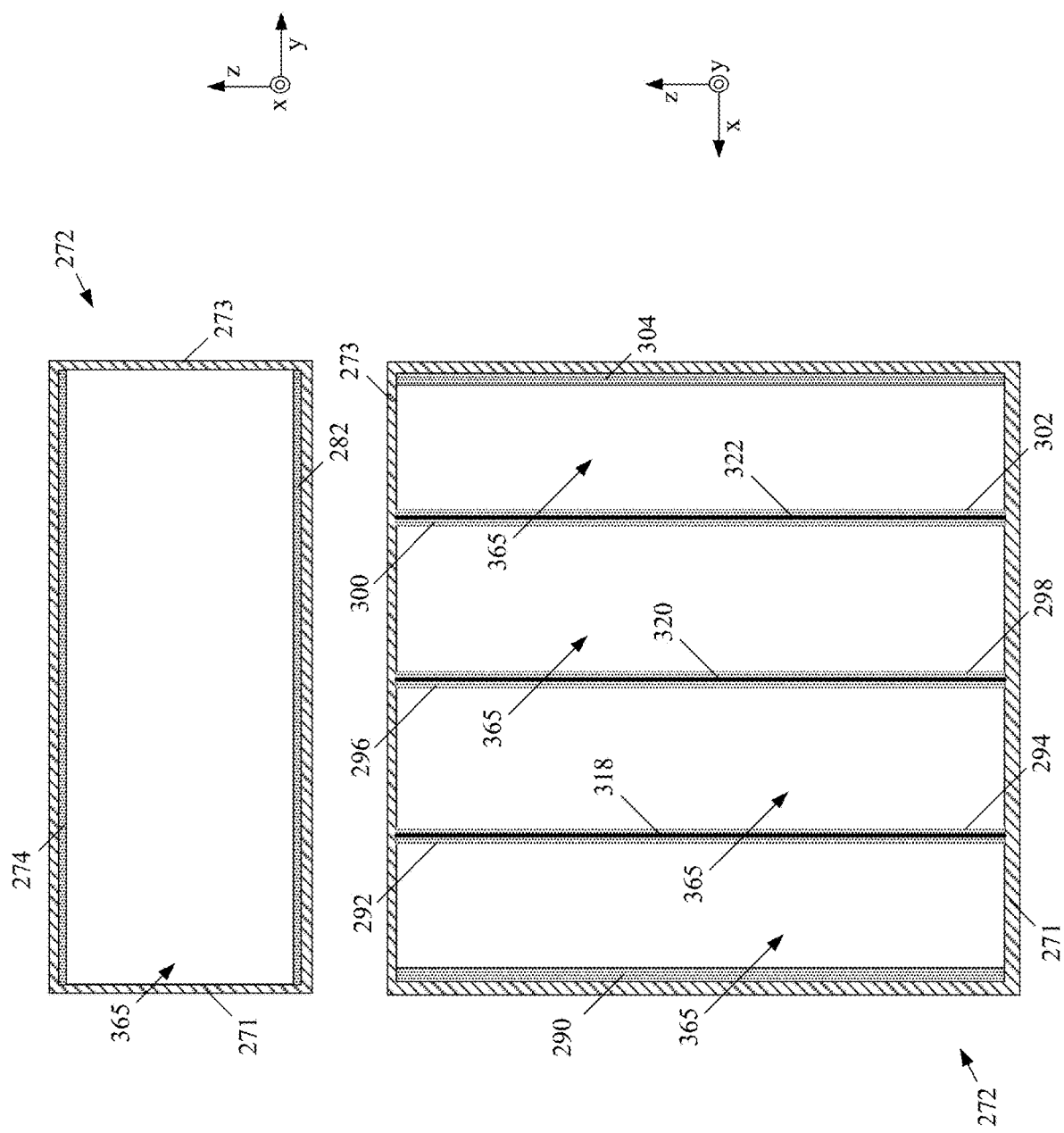
FIG. 36a is a cross-sectional view of an alternative to the main housing seen in FIG. 36.
FIG. 37a is a cross-sectional view of an alternative to the main housing seen in FIG. 37.

In at least some alternative embodiments, the insulating material 364 is replaced with a gas that is contained within containment spaces 365 located between opposing electrodes, as seen in FIGS. 36*a* and 37*a*. In some preferred embodiments, the gas is hydrogen. Use of hydrogen gas is beneficial insofar as the hydrogen gas—in additional to being an insulator—will provide a degree of lift, thereby reducing the weight of the UAV. This buoyancy-assisted lift provided by the hydrogen gas thus will lessen the power requirements for operating the UAV. The hydrogen gas also may be pressurized in some embodiments, thereby buttressing the structural integrity of the walls of the containment spaces 365. It further is contemplated that, in at least some preferred embodiments, helium gas is utilized instead of hydrogen gas and that, in some embodiments, the helium is pressurized for buttressing the structural integrity of the walls of the containment spaces 365. In still yet other preferred embodiments, a vacuum is created and maintained within the containment spaces of the housing 272. In other preferred embodiments, the gas—whether helium or hydrogen—is heated. Such heating may be accomplished through spark gaps or resistive heaters utilizing voltage differentials and current flow between electrodes. Of course, no oxygen is introduced especially when hydrogen is utilized so as to eliminate risks of potential explosions or fires.

It will be appreciated that each electrode in FIGS. 36 and 37 has at least two overall substantial dimensions, i.e., length and height, a first of which is at least 80% of at least one of an overall heightwise extent, an overall lengthwise extent, and an overall widthwise extent of the UAV, and a second of which is at least 80% of at least one of the overall heightwise extent, the overall lengthwise extent, and the overall widthwise extent of the UAV. Such specified percentages apply only in some and not all embodiments of the invention and are set forth herein as preferred only in some contemplated scenarios; the percentages are different in other embodiments and may be extremely small, as will be apparent from a review of FIG. 41, for example.

The electrodes in FIGS. 36 and 37 are separated and electrically insulated from each other for enabling a differential in voltage resulting from a differential in electric field strength experienced at the electrodes when within the vicinity of the powerlines. Furthermore, the UAV comprises electrical components electrically connected with the electrodes that establish an electric circuit, with the differential in voltage between the electrodes causing a current to flow through the circuit for powering an electrical load of the electric circuit. A representative arrangement of such electrical components is discussed next with reference to FIG. 38.

Figure 38:
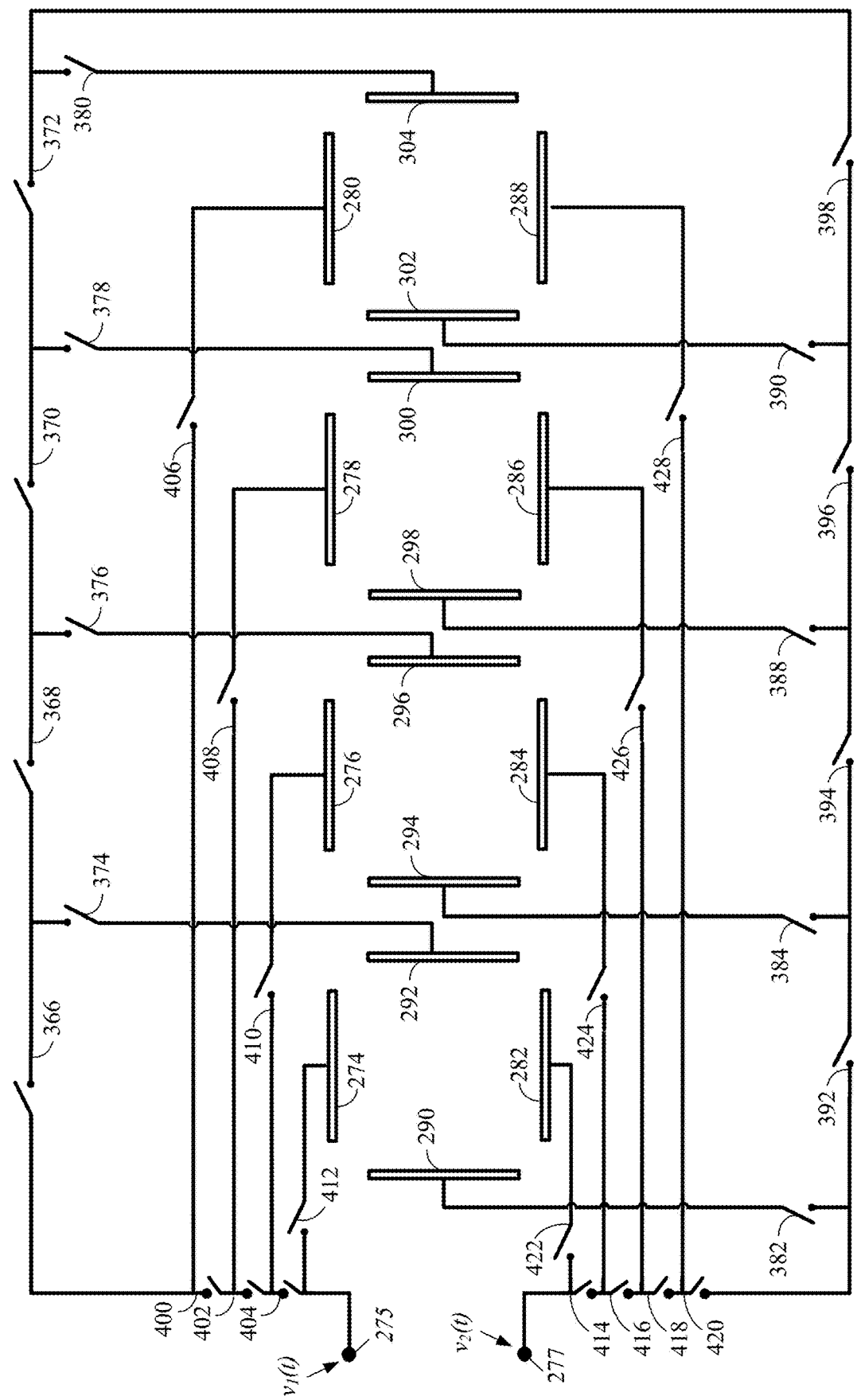
FIG. 38 is a schematic illustration of a plurality of electrodes and a plurality of electrical components for circuit-switching in establishing electric circuits in accordance with one or more embodiments of the invention.

FIG. 38 is a schematic illustration of a plurality of electrodes and a plurality of electrical components for circuit-switching in establishing electric circuits in accordance with one or more embodiments of the invention. Indeed, the schematic illustration is considered to be representative of what may be utilized in connection with an EFA generator similar to that of FIGS. 30-37 but wherein the back terminal conduits are omitted and, as such, numbering in FIGS. 30-37 has been carried forward into FIG. 38, where applicable. In this regard, FIG. 38 schematically illustrates the sixteen electrodes including the upper electrodes 274, 276,278,280; the lower electrodes 282,284,286,288; the side electrodes 290,304; and the intermediate electrodes 292,294, 296,298,300,302. Terminals 275,277 also are schematically illustrated.

In order to provide the ability to establish the plurality of different electric circuits, a set of switches 366,368,370,372, 374,376,378,380,382,384,386,388,390,392,394,396,398, 400,402,404,406, 408,410,412,414,416,418,420,422,424, 426,428 are provided for opening and closing electrical pathways. Broadly as used herein, "switch" is used in the electrical engineering context to indicate an electrical component that can make or break an electric circuit, interrupting the current or diverting it from one pathway to another. It is contemplated that each switch may take one of a plurality of conventional forms and equivalents thereof that are apparent to the Ordinary Artisan.

Additionally, each switch preferably is controlled by a controller in accordance with one or more "circuit-switching" algorithms contained within machine-executable instructions stored in non-transitory machine-readable medium. The controller may comprise a processor, a microcontroller, or an integrated circuit including an application specific integrated circuit (ASIC), or equivalents thereof. The controller may be located in the EFA generator and form part of the illustrated circuit of FIG. 38. Alternatively, the controller may be located external to the EFA generator such as, for example, when the EFA generator is in the form of a removable power supply unit. In the latter scenario, the controller may be included in a secondary housing, or within a portion of the conduits of the main housing. Moreover, the controller may be connected by wire with each switch for controlling the state of the switch or may be connected wirelessly with each switch for controlling the state of the switch. The controller, in accordance with the one or more algorithms, performs circuit switching in order to optimize the power harness of the electric field differentials and the powering of the electrical load. A preferred such algorithm results in the controller selecting and configuring the switches to establish an electric circuit that best matches voltage and current specifications of an electrical load of the electric circuit to be powered.

Broadly speaking, such specifications may be preprogrammed for access by the controller or communicated to and stored by the controller from time-to-time as the object to be powered changes. In some embodiments, the controller determines the power requirements based on detection of an identification of the object to be powered, and in some other embodiments determines the power requirements based on a connection port or outlet to which the object is electrically connected for being powered. One or more sensors also preferably are included for detecting voltages of the electrodes, whereby the controller may determine appropriate electrodes for establishing an electric circuit for powering a particular object.

The switches can be configured by the controller such that a subset of two or more electrodes of the set of electrodes are joined in parallel such that all have a common voltage, which subset is connected through the terminals to another subset of one or more of the electrodes. An example of this would be where switches 400,402,404,406,412 are closed to join in parallel electrodes 274,280, and similarly switches 414,416,418,420,428,392,394,396,382,390 are closed to join in parallel electrodes 288,290,302, while opening all of the other switches illustrated in FIG. 38 and electrically separating electrodes 274,280 joined in parallel from electrodes 288,290,302 joined in parallel. Voltage differentials between the subset of electrodes 274,280 and the subset of electrodes 288,290,302 thus can be used to power an electrical load connected to the terminals.

Further, it should be appreciated that the electrodes of a subset need not be in a common or parallel orientation; and that the subsets of electrodes need not be in a common or parallel orientation. Moreover, it should be appreciated that an increase in spacing between electrically separated electrodes also does not necessarily result in a greater voltage differential between the electrodes. This is because, as indicated in FIGS. 4 and 5, the electric fields at any particular point within the vicinity of powerlines represent the combined electric fields of each powerline of the arrangement of powerlines; when three powerlines form part of the arrangement, the electric field strength varies greatly and not necessarily based on separation of or orientation of the electrodes. Hence, the capability of the controller to identify the voltages of the electrodes and establish circuits by including, via the switches, those electrodes having suitable voltages resulting in desired voltage differentials and currents enables the EFA generator to better harvest power from the electrical fields of the powerlines.

This ability is advantageous whether the EFA generator is moving through a vicinity of powerlines or is stationary within the vicinity of powerlines. In the former scenario, establishing different electric circuits by interconnecting different electrodes can yield a desired voltage and/or current for powering the same object, whereas in the second scenario various objects having different voltage and/or current requirements each can individually be accommodated by establishing different electric circuits by interconnecting different electrodes.

Moreover, application of this algorithm preferably is repeatedly done over regular intervals, including intervals less than one second, where the EFA generator moves through electric fields or otherwise experiences varying electric field strengths at the electrodes with resulting varying voltage differentials. This results in varying voltages over time relative to a constant reference voltage and is represented in FIG. 38 by $v_1(t)$ at terminal 275 and $v_2(t)$ at terminal 277. When $v_1(t)$ at terminal 275 and $v_2(t)$ at terminal 277 are different and terminals 275,277 are connected to a load for powering the load, a current as a function of time results.

Due to the varying voltages, the current will vary as well, including reversing in direction so as to result in an alternating current. One or more rectifiers may form part of the electrical pathway between the terminals 275,277 or may be included in the EFA generator and form part of the illustrated circuit of FIG. 38 for converting an alternating current to direct current, as desired. Moreover, any such rectifier can be included as part of a normalizer, which is discussed above.

Furthermore, a plurality of capacitors arranged in series, in parallel, or a combination thereof may form part of the electrical pathway between the terminals 275,277 or may be included in the EFA generator and form part of the illustrated circuit of FIG. 38 for altering the voltage and current characteristics, as desired. Moreover, any such arrangement can be included as part of a normalizer, discussed above. If such an arrangement of capacitors is included, the arrangement preferably is located within an area shielded from the external electric fields actuating the EFA generator. For example, such arrangement may be included in a secondary housing having an interior area that is shielded from the effects of the external electric fields, or within a portion of the conduits that similarly is shielded from the effects of the external electric fields, or even within an area of the main housing that is shielded from the effects of the external electric fields but which area does not include one of the electrodes having the voltage arising from the external electric fields. The use of one or more such capacitor arrangements is believed to be beneficial, for example, when there is a large differential in voltage between electrodes of an established electric circuit.

Figure 39:
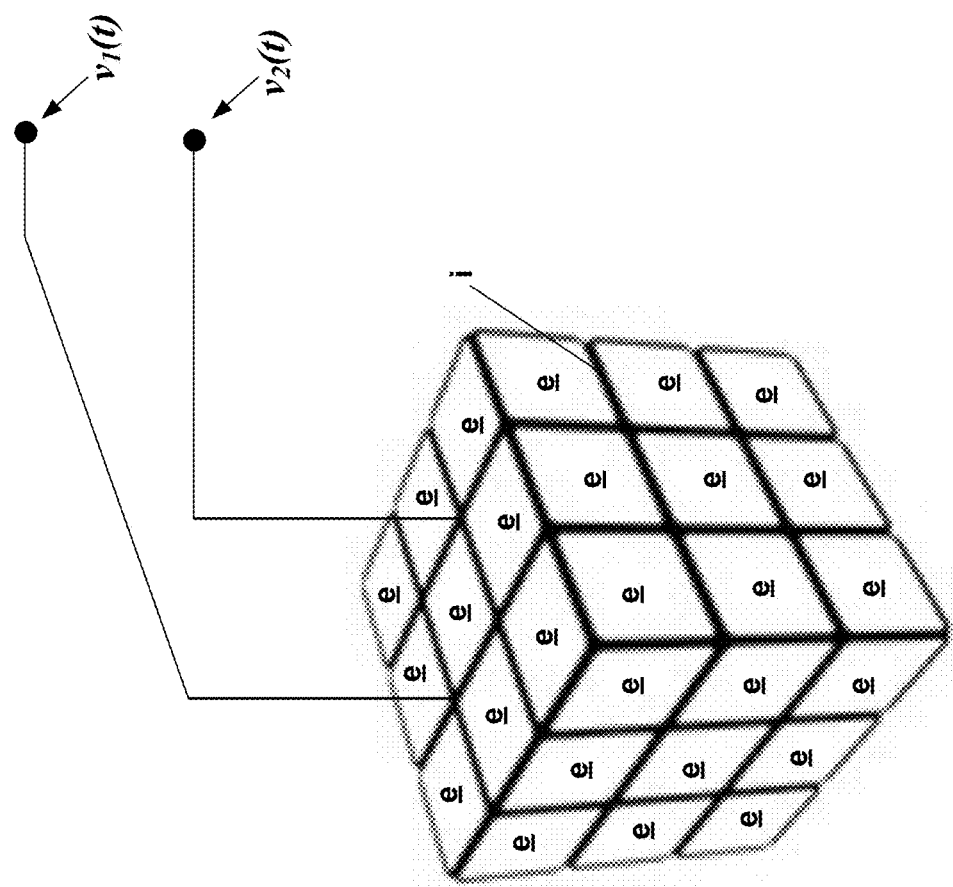
FIG. 39 illustrates an arrangement of electrodes in the shape of a cube.
Figure 40B:
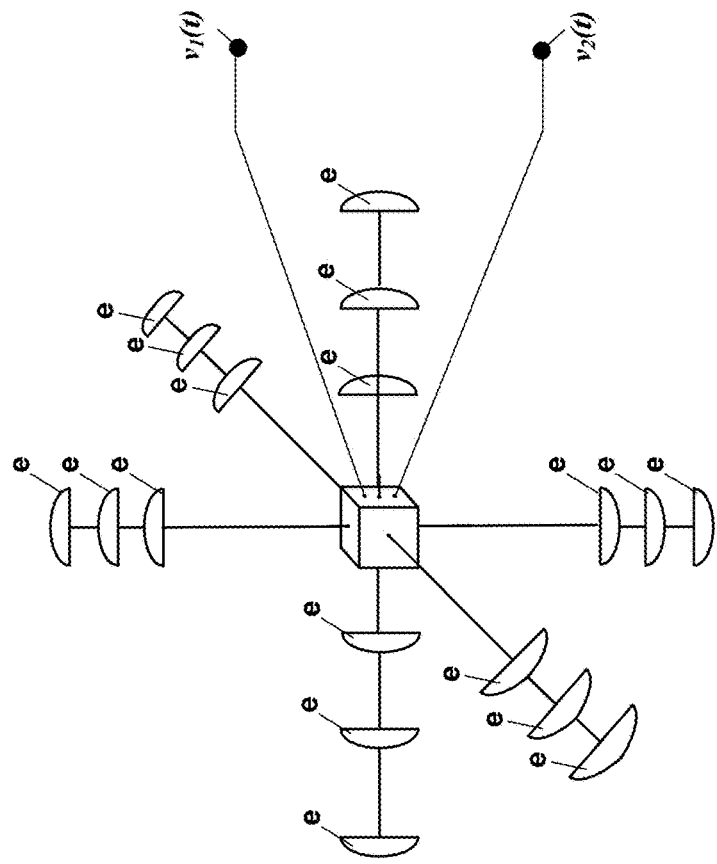
FIG. 40b illustrates another arrangement of electrodes along three orthogonal axes in a nested "jacks" configuration.
Figure 40A:
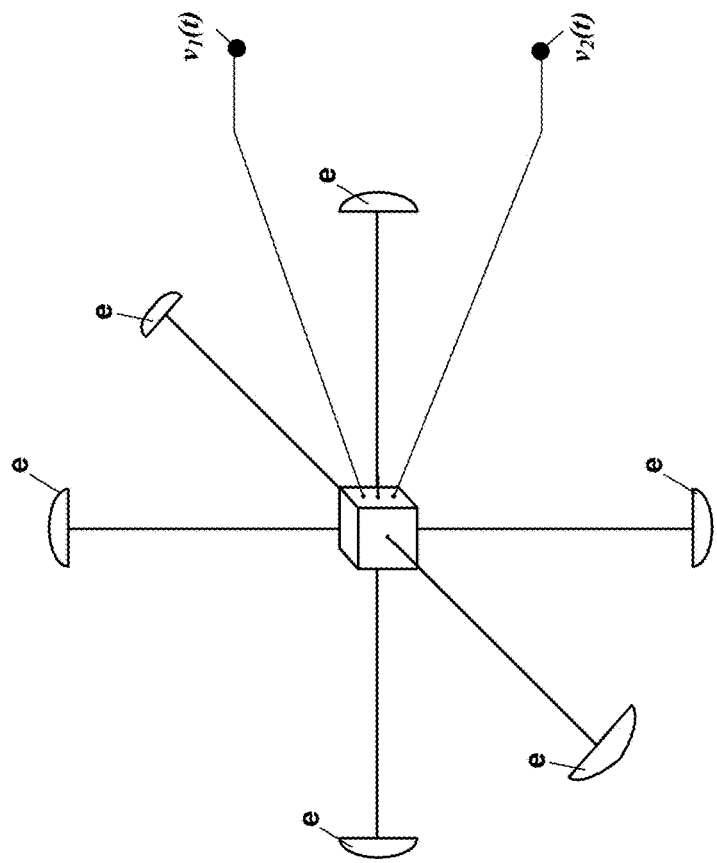
FIG. 40a illustrates another arrangement of electrodes along three orthogonal axes in a "jacks" configuration.
Figure 41:
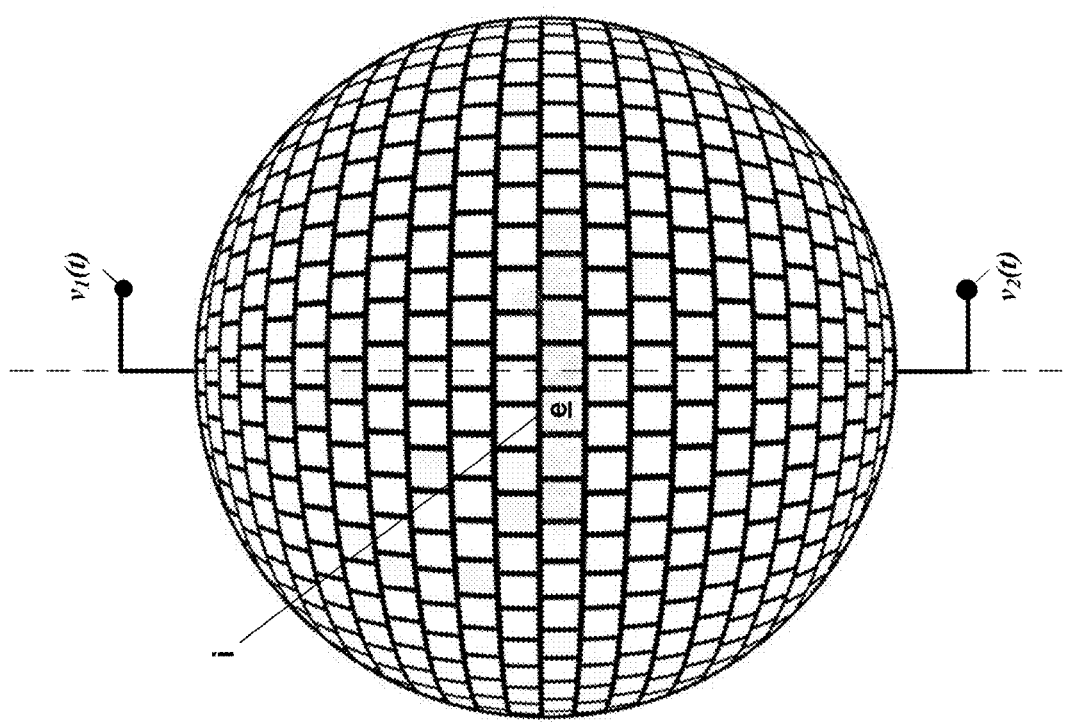
FIG. 41 illustrates another arrangement of electrodes in the shape of a disco ball.

Turning to FIGS. 39-41, it will be appreciated that arrangements of the electrodes may form various shapes. Furthermore, it will be appreciated that in each arrangement, an area of the plurality of electrodes in at least one of a plurality of different electric circuits that may be established may be less than or equal to a percentage of an area of a set of electrodes in at least one other of the plurality of different electric circuits that may be established. The percentage may be 50%, 25%, or 10%, for example. The area of a plurality of electrodes is calculated by adding the individual area of each electrode of the circuit, which is calculated with reference to the greatest surface area of the electrode without regard to the thickness or width of the electrode.

As seen in FIG. 39, wherein electrodes are identified by the letter "e", the arrangement of electrodes forms a cube having the appearance of a "Rubik's" cube, with the electrodes being located on the outer surface of the cube and electrically insulated from one another. As seen in FIG. 39, nine electrodes form a side of the cube. Additionally, the electrodes are electrically insulated from one another by insulator "i" which outlines the rectangular profile of the electrodes.

While nine electrodes are seen forming each surface of the cube, other matrices of electrodes may be used, including 1×1; 2×2; 4×4; 5×5; 6×6; 7×7; 8×8; 9×9; and 10×10, for example. In an arrangement in which a 10×10 electrode matrix is utilized for each of the six faces, it will be appreciated that, as examples, a first circuit may be established using all of the electrodes; a second circuit may be established using 50% of the electrodes; a third circuit may be established using 25% of the electrodes; and a fourth circuit may be established using 10% of the electrodes. In such scenarios the area of the plurality of electrodes forming part of the second electric circuit is 50% of the area of the plurality of electrodes forming part of the first electric circuit; the area of the plurality of electrodes forming part of the third electric circuit is 25% of the area of the plurality of electrodes forming part of the first electric circuit; and the area of the plurality of electrodes forming part of the fourth electric circuit is 10% of the area of the plurality of electrodes forming part of the first electric circuit.

Additionally, electrodes may be arranged in multiple cube arrangements to form a nested grouping of cubes, wherein each cube is formed by a plurality of electrically insulated electrodes.

FIG. 40a illustrates yet another example of an arrangement of electrodes, wherein six electrodes "e" are located along each of three orthogonal axes in a "jacks" configuration. Additionally, electrodes may be arranged along three orthogonal axes to form a nested jacks arrangement, as seen in FIG. 40b.

FIG. 41 illustrates another example of an arrangement of electrodes (a representative one of which is identified by the letter "e"), wherein the electrodes are located on the outer surface of a sphere so as to resemble a disco ball, with each electrode being located where a mirror would be found in the disco ball. Additionally, the electrodes are electrically insulated from one another by insulator "i" which outlines the quadrilateral-shaped electrodes. Additionally, electrodes may be arranged in multiple sphere arrangements to form a nested grouping of spheres, wherein each sphere is formed by a plurality of electrically insulated electrodes.

It further will be appreciated that within such arrangements as represented by FIGS. 39-41, the controller, switches, sensors, and electrical pathways preferably are contained within an interior of the arrangement of the electrodes, and electrical pathways for the terminals extend from an interior to an exterior of the arrangements, as schematically represented in these figures by the terminals respectively having voltages $v_1(t)$ and $v_2(t)$.

Returning back now to the specific context of UAVs in discussing implementations having one or more aspects and features of the invention, UAVs that are box-like in shape—or at least having a main housing that is box-like in shape—have been described; however, it is contemplated that UAVs may have fixed wings for lift rather than rotors or may have a combination of one or more rotors and one or more fixed wings.

Finally, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. An unmanned aerial vehicle (UAV) airways system, comprising:
   (a) a plurality of UAVs traveling along high-voltage power transmission lines within corridors, with one or more UAVs traveling in a first direction within one of said corridors and with one or more other UAVs traveling in a second direction opposite to the first direction within another of said corridors;
   (b) wherein one or more of the plurality of UAVs comprise a particular UAV in which electric power is generated for an electrical load from one or more differentials in electric field strength arising from the power transmission lines, comprising:

(i) a plurality of separated electrodes;

(ii) electrical components electrically connected with the plurality of electrodes, at least one or more of the electrical components being configurable to establish each of a plurality of different electric circuits, each of the different electric circuits comprising a set of two or more mutually exclusive subsets of the plurality of electrodes, the electrodes in each subset that have more than one electrode being electrically connected with each other for avoiding a voltage differential therebetween, and the one or more electrodes of each subset being electrically insulated from each electrode of any other subset of the set for enabling one or more voltage differentials between the subsets of the set resulting from a differential in electric field strength experienced by the particular UAV arising from the power transmission lines, wherein the subsets of the set are interconnected such that the one or more voltage differentials between the subsets causes a current to flow through the electric circuit of the set for powering the electrical load; and (iii) a control assembly comprising:

(A) one or more voltage-detector components configured to detect voltage differentials of the sets; and (B) a processor enabled to process the detected voltage differentials and—based thereon and based on voltage and electric current specifications for powering the electrical load—configure one or more of the electrical components in order to establish one of the plurality of different electric circuits for powering the electrical load;

(iv) wherein, in at least one of the plurality of different electric circuits, a plurality of the subsets of electrodes are electrically connected so as to form a plurality of capacitors arranged either in series or in parallel.

2. The UAV airways system of claim 1, wherein the corridors are predetermined and wherein the UAVs have information identifying the predetermined corridors whereby the UAVs are able to navigate within the predetermined corridors.

3. The UAV airways system of claim 2, wherein the information identifying the predetermined corridors identifies a direction of travel within each predetermined corridor, the direction of travel either being in the first direction or the second direction.

4. The UAV airways system of claim 2, wherein the information identifying the predetermined corridors is maintained in a navigational database of each UAV.

5. The UAV airways system of claim 1, wherein the control assembly of the particular UAV configures one or more of the electrical components in order to establish one of the plurality of different electric circuits for powering the electrical load on a recurring basis when the particular UAV is in the vicinity of the power transmission lines.

6. The UAV airways system of claim 1, wherein the control assembly of the particular UAV configures one or more of the electrical components in order to establish one of the plurality of different electric circuits for powering the electrical load on a recurring basis when the particular UAV moves while in the vicinity of the power transmission lines.

7. The UAV airways system of claim 1, an area of the plurality of electrodes in at least one of the plurality of different electric circuits of the particular UAV is less than or equal to 50% of an area of the set of electrodes in at least one other of the plurality of different electric circuits.

8. The UAV airways system of claim 1, wherein the electrical load of the particular UAV comprises a rechargeable battery of the UAV.

9. The UAV airways system of claim 1, wherein the plurality of electrodes of the particular UAV is located in a block arrangement and define walls of the block.

10. The UAV airways system of claim 9, wherein the electrodes of the particular UAV each comprises a planar rectangular surface.

11. The UAV airways system of claim 9, wherein the electrodes of the particular UAV define inner surfaces of the block.

12. The UAV airways system of claim 9, wherein the electrodes of the particular UAV define outer surfaces of the block.

13. The UAV airways system of claim 1, wherein the plurality of electrodes of the particular UAV is located in an arrangement of nested blocks and defines walls of the blocks.

14. The UAV airways system of claim 13, wherein the control assembly of the particular UAV is located within the innermost block.

* * * * *